US007236161B2

(12) United States Patent
Geaghan et al.

(10) Patent No.: US 7,236,161 B2
(45) Date of Patent: Jun. 26, 2007

(54) REMOTE TOUCH SIMULATION SYSTEMS AND METHODS

(75) Inventors: Bernard O. Geaghan, Salem, NH (US); Gordon F. Taylor, Bolton, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 503 days.

(21) Appl. No.: 10/394,522

(22) Filed: Mar. 21, 2003

(65) Prior Publication Data

US 2004/0183787 A1  Sep. 23, 2004

(51) Int. Cl.
G09G 5/00  (2006.01)

(52) U.S. Cl. ........................ 345/173; 345/156

(58) Field of Classification Search ............... 345/156, 345/173, 178, 174, 175, 177
See application file for complete search history.

(56) References Cited

U.S. PATENT DOCUMENTS

| | | | |
|---|---|---|---|
| 4,686,332 A | 8/1987 | Greanias et al. | |
| 5,162,783 A | 11/1992 | Moreno | |
| 5,283,559 A * | 2/1994 | Kalendra et al. | 345/168 |
| 5,650,597 A | 7/1997 | Redmayne | |
| 5,768,492 A | 6/1998 | Schumer | |
| 5,844,506 A | 12/1998 | Binstead | |
| 6,181,328 B1 * | 1/2001 | Shieh et al. | 345/178 |
| 6,251,014 B1 | 6/2001 | Stockdale et al. | |
| 6,337,681 B1 * | 1/2002 | Martin | 345/178 |
| 6,353,433 B1 | 3/2002 | Schumer | |
| 6,456,952 B1 | 9/2002 | Nathan | |
| 6,977,646 B1 * | 12/2005 | Hauck et al. | 345/173 |
| 2001/0032057 A1 * | 10/2001 | Smith et al. | 702/94 |

FOREIGN PATENT DOCUMENTS

| | | |
|---|---|---|
| EP | 0 181 612 A2 | 11/1985 |
| EP | 0 181 612 B1 | 11/1985 |
| EP | 0 283 249 A2 | 3/1988 |
| EP | 1 179 768 A2 | 2/2002 |
| WO | WO 2004/068332 | 8/2004 |

OTHER PUBLICATIONS

U.S. Appl. No. 09/998,614, filed Nov. 30, 2001, System and Method for Locating a Touch on a Capacitive Touch Screen.
U.S. Appl. No. 10/176,564, filed Jun. 21, 2002, Capacitive Touch Sensor Architecture With Unique Sensor Bar Addressing.
U.S. Appl. No. 10/183,876, filed Jun. 25, 2002, Touch Sensor.
U.S. Appl. No. 10/201,400, filed Jul. 23, 2002, Thin Face Capacitive Touch Screen.

* cited by examiner

Primary Examiner—Ricardo Osorio

(57) ABSTRACT

Systems and methods provide for simulating an effective human touch on a touch screen sensor of a touch screen system. Touch simulation involves interaction with, or cooperation between, a subject touch screen system and a remote system via a communication or network link. Remote touch simulation typically involves establishing a communication link between the touch screen system and a remote location, simulating a touch to the touch screen sensor, and communicating data associated with simulating the touch between the touch screen system and the remote location via the communication link. Remote touch simulation can be employed to perform various types of diagnostics, calibration, and repair procedures.

69 Claims, 22 Drawing Sheets

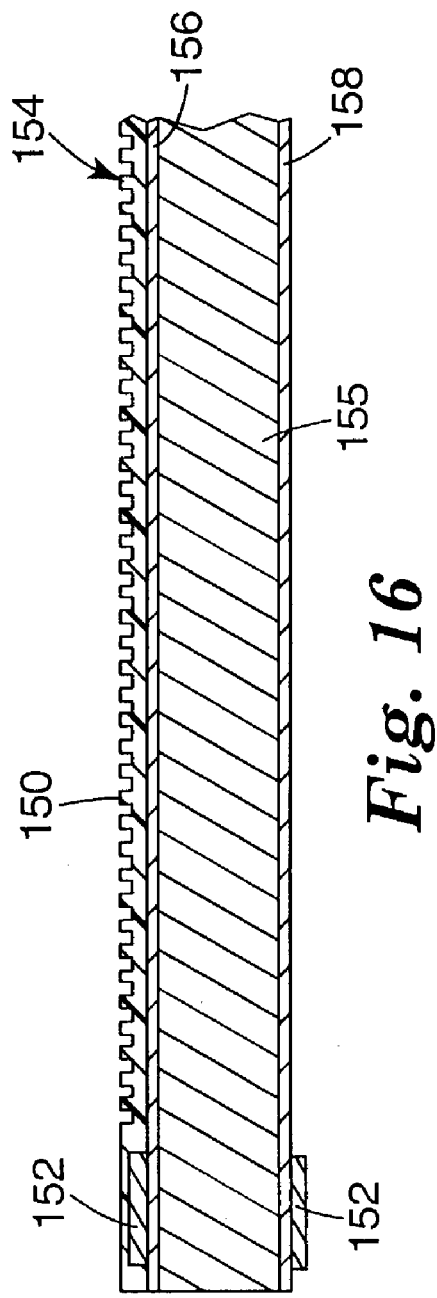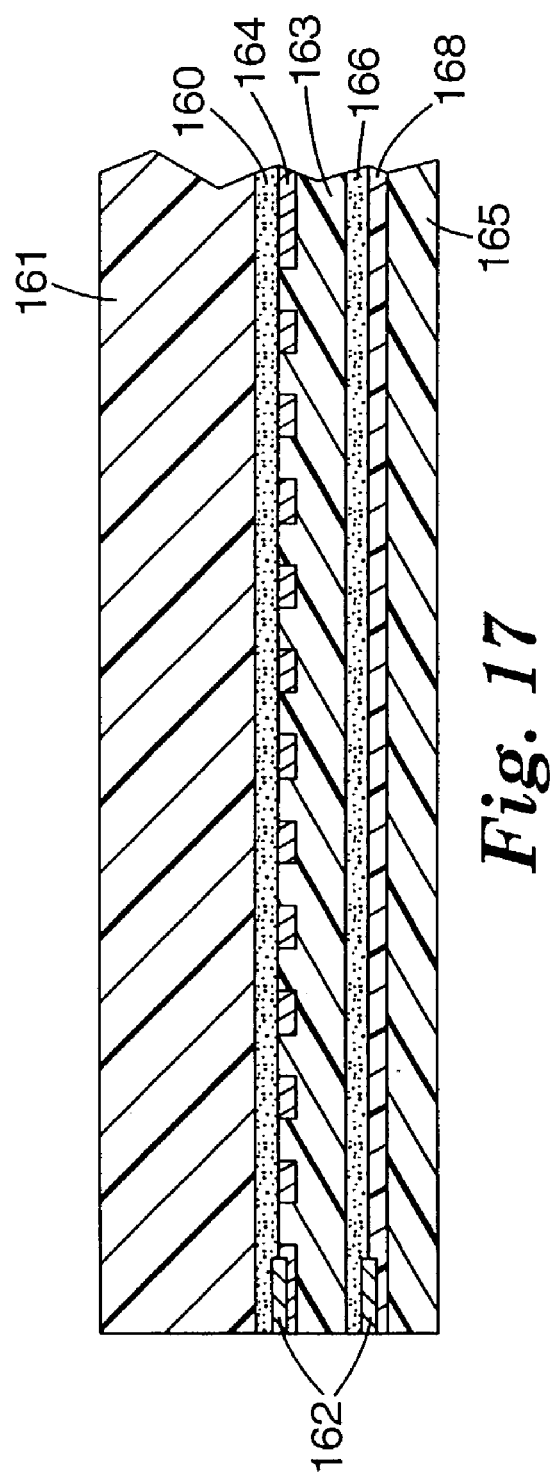

REMOTE TOUCH SIMULATION SYSTEMS AND METHODS

FIELD OF THE INVENTION

The present invention relates generally to touch screen systems and, more particularly, to systems and methods for effecting remote simulation of an effective human touch on a touch screen sensor.

BACKGROUND OF THE INVENTION

A typical touch screen employs a sheet of glass with a conductive coating, such as indium tin oxide, with four corner terminal connections. The touch screen may be configured as a capacitive or resistive touch screen, with a pattern of electrodes made of conductive material. A finger, stylus, or conductive top sheet can draw or inject current at the point of contact. The current can then distribute to the touch panel terminals in a proportionate manner relative to the location of the point of contact.

Touch detection accuracy of the touch screen can change over time due to a number of system and environmental reasons, such as wear during extended use. Monitoring, testing, and servicing of touch screen systems has conventionally involved manual evaluation of a suspect system by an on-site technician. Such conventional evaluation and repair approaches are both costly and time inefficient. As use of touch screen systems becomes more widespread, particularly in networked applications involving dozens, hundreds, or even thousands of such systems, conventional on-site monitoring, testing, and servicing approaches will become increasingly expensive and less practical to implement.

SUMMARY OF THE INVENTION

The present invention is directed to systems and methods for simulating an effective human touch on a touch screen sensor. Systems and methods of the present invention are particularly directed to touch simulation involving interaction with, or cooperation between, a subject touch screen system and a remote system via a communication or network link. Remote touch simulation typically involves establishing a communication link between the touch screen system and a remote location, simulating a touch to the touch screen sensor, and communicating data associated with simulating the touch between the touch screen system and the remote location via the communication link.

Remote touch simulation is typically employed for purposes of performing various types of diagnostics, calibration, and repair procedures, for example. Touch simulation can involve processes performed at a remote site, such as initiating, monitoring, analyzing, or controlling a touch simulation process. Results of a procedure involving touch simulation, such as current and historical touch detection accuracy data, can be acquired and used locally or remotely to assess the operational fitness of the touch screen sensor over time. Touch simulation methodologies implemented in accordance with the principles of the present invention provide for enhanced diagnostic, calibration, and maintenance capabilities that can be used across a number of differing touch screen sensor technologies, including, for example, capacitive, resistive, non-capacitive force, active or passive acoustic, and infrared touch screen sensor technologies.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 16 is a sectional view of a capacitive touch screen sensor in accordance with an embodiment of the present invention;

FIG. 17 is a sectional view of a near field imaging (NFI) capacitive touch screen sensor in accordance with an embodiment of the present invention;

Figure 1:
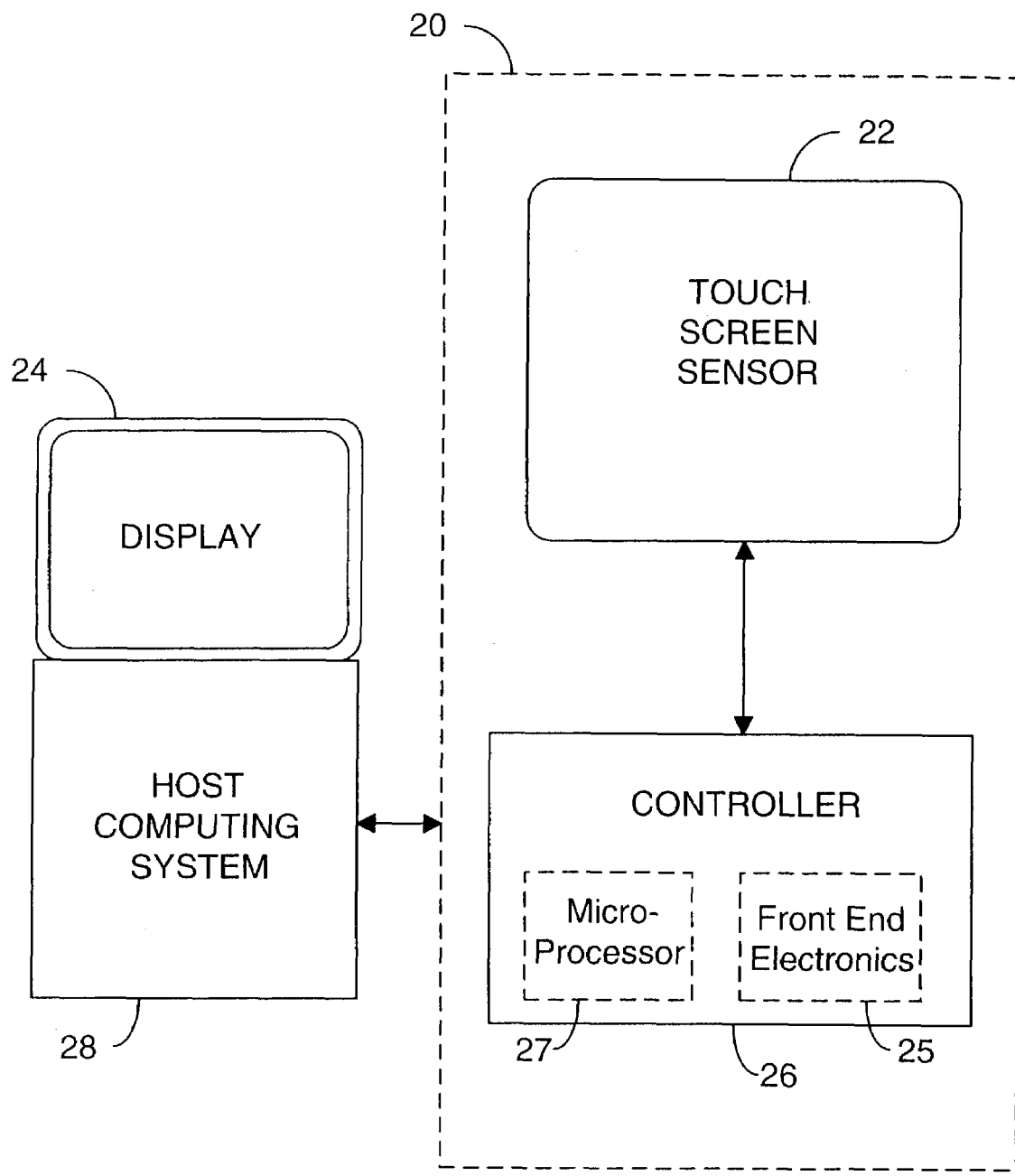
FIG. 1 is an illustration of a touch screen system which employs a remote touch simulation capability in accordance with an embodiment of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to systems and methods for simulating a touch on a touch screen sensor which involve interaction between a remote system and a touch screen system (TSS) which incorporates the touch screen sensor or a local processor coupled to the TSS. Systems and methods of the present invention are also directed to cooperative operation between a TSS and a remote system for purposes of performing monitoring, diagnostic, calibration, and/or servicing operations, which may or may not involve touch simulation.

Various embodiments of the present invention provide for establishing a communication link between the touch screen sensor and a remote location, simulating a touch to the touch screen sensor, and communicating data associated with simulating the touch between the TSS and the remote location via the communication link. Touch simulation involving remote system participation is often effected for purposes of performing various types of diagnostics, calibration, and repair procedures, for example.

Simulating a touch on a touch screen sensor can involve processes effected from, or performed at, a remote site, such as initiating, monitoring, analyzing, or controlling a touch simulation process. Touch simulation methodologies implemented in accordance with the principles of the present invention provide for enhanced diagnostic, calibration, and maintenance capabilities that can be used across a number of differing touch screen sensor technologies, including, for example, capacitive (including analog capacitive as well as projected capacitive technologies such as capacitive grids and near field imaging), resistive, closed system capacitive (such as disclosed in commonly assigned U.S. patent application Ser. No. 10/183,876, which is wholly incorporated herein by reference), non-capacitive force, active or passive acoustic, and infrared TSS technologies.

The techniques discussed herein for simulation of touch inputs in capacitive and resistive touch technologies can be applied to so-called closed system capacitive technologies, such as disclosed in co-assigned U.S. Ser. No. 10/183,876, in which a flexible conductive element can be disposed over a fixed conductive element so that under a touch input, the flexible conductive element is locally deformed and thereby brought closer to the fixed conductive element so that a capacitive coupling can be made. The signal generated by the capacitive coupling can be used to determine the location of the touch, much as with more conventional analog capacitive sensors.

It has been found that changes in touch detection accuracy can result during use of a given touch screen sensor and its associated electronic controller. For example, changes in the coordinates detected by a given touch screen sensor can result in touch detection inaccuracies resulting from wear, environmental factors, or characteristics of a particular application or system in which the TSS is implemented. It is important that any such changes in TSS detection accuracy and overall TSS performance be monitored so that recalibration or maintenance on the touch screen systems can be initiated when necessary. Traditionally, a skilled technician typically gathers such data by performing on-site servicing to the touch screen system, often after TSS performance has significantly degraded to a level that adversely impacts use of the system.

A touch simulation approach according to the present invention provides for enhanced monitoring of TSS performance in a manner that can eliminate the need for on-site testing and servicing by a skilled technician in many cases. In cases where on-site evaluation and repair is deemed necessary, TSS controller assisted repair can be effected via communication between the TSS and a remote system. For example, a technician can be guided through TSS evaluation and repair procedures by use of visual and/or audible information communicated to the technician via the TSS or host computing system coupled to the TSS. Touch and other system parameters can be changed remotely and/or locally. Information transferred between the TSS and remote system can be solely computer generated information, solely technician generated information, or a combination of computer and technician generated information.

Certain embodiments of the present invention provide for local initiation of TSS diagnostic and calibration tests that involve the simulation of a touch by the TSS or a host computing system which incorporates a TSS. A remote system can participate to enhance such diagnostic and calibration functions, such as by acquiring data during or after implementation of such functions. For example, diagnostics or calibration data can be communicated to a remote system in real-time, the remote system can evaluate this data, and processed data and/or diagnostics/calibration algorithms can be transferred from the remote system to the TSS or host processor coupled to the TSS. Other embodiments of the present invention provide for remote initiation of TSS diagnostic and calibration tests that involve the simulation of a touch by the TSS or a host computing system which incorporates a touch screen sensor.

Touch simulation in accordance with the present invention can be initiated by software executable by a host computing system which incorporates a touch screen system or by software/firmware executable by a TSS controller. The touch simulation software can be controller locally or remotely via a network connection, for example, preferably at off-peak times, during periods of TSS idleness, or during regularly scheduled maintenance. Each time a touch is simulated, the detected position of the touch can be recorded locally, such as on the host computing system, and stored in a file or database. Over a period of time, changes in the value of the recorded touch can be tracked, such as in an activity log. Trends can be monitored and, if necessary, maintenance alert messages can be issued. Various operations implicated in TSS monitoring, evaluation, and repair can be performed locally, remotely, or cooperatively via local and remote resources.

Automated touch simulation approaches of the present invention provide for a highly repeatable touch that can be simulated at a prescribed screen location with high accuracy. The ability to simulate a touch at a prescribed location with high precision provides for a high resolution of touch detection accuracy. It can be appreciated that human touches made at a prescribed calibration location of a touch screen, for example, can be subject to significant positional inaccuracies, since a repeated human touch rarely occurs in the same location.

Another source of inaccuracies that can adversely affect conventional TSS monitoring and testing approaches involves intended or unintended adjustment to video position, size, and horizontal and vertical dimensions of the display (e.g., cathode ray tube) to which the touch screen sensor is attached. A touch target on the display will move if changes are made to these parameters. When a human uses a predetermined touch target of the display to test for touch coordinate movement, repeatability is virtually impossible.

Touch simulation methodologies of the present invention find utility in a wide variety of applications. For example, entertainment systems can be installed in public locations, such as in arcades, casinos, and bars, where accuracy of touch is essential. At off peak times, or during system startup or shutdown or other predetermined times, a background maintenance program involving a simulated touch can be run, and any changes in touch position can be recorded. Changes over time to the touch position can be monitored, and significant variations can be reported to an operator or owner for servicing. A service engineer can, for example, initiate background maintenance remotely on demand over a computer network or on site. Such background maintenance routines can also be initiated locally or remotely according to a scheduled maintenance program, which may be during periods of detected system idleness or during system startup or shutdown, for example.

A technician can remotely access the TSS via a network or dial-up connection. By way of example, the TSS can be accessed via a communication link established between a remote computing system and the controller of the TSS, assuming the TSS includes an appropriate communications interface. Alternatively, or in addition, the TSS can be accessed via a communication link established between the remote computing system and the communications interface of a host computing system which incorporates a TSS.

Provision of communication interfacing between a TSS or a number of networked TSSs and a remote system can significantly enhance TSS functionality, performance, and reliability. A number of robust capabilities heretofore unrealizable for touch screen sensor applications can be realized through such provision of communication interfacing between one or more TSSs and a remote system. Real-time or near real-time access to TSS status, including error events, performance anomalies, and changes in touch quality from a remote site, for example, can be readily achieved. Firmware patches can be downloaded from a remote system to one or more TSSs. Such firmware patches, which are typically used to add features or correct problems to TSS controller firmware, can be downloaded to a single TSS or simultaneously to a number of networked TSSs. Touch parameters can be changed from a remote system for a variety of purposes, including for purposes of tuning a TSS.

As was discussed previously, background or periodic maintenance and diagnostic functions can be run automatically at off hours for testing and data collection purposes. A remote system, or a local system, can initiate TSS controller and sensor diagnostics. Diagnostics software can carry out a series of tests on the system to check for changes in TSS performance and warn of potential problems. Such software can include self-test procedures and/or can run under manual control to check for specific problems.

TSS performance data can be acquired over time for individual TSSs. The performance data can be processed and reports generated at a remote location or locally. System configuration and maintenance information, such as controller and sensor type, serial number, and version, can be acquired and reported to the remote system. Data associated with system components and maintenance activities, including changes to components, software, firmware, and servicing/repair history, for individual TSSs can be maintained.

De-bug software can be transferred from a remote system or a local host system to a particular TSS for performing more intensive evaluations of the system. For example, de-bug firmware can be loaded on to the TSS controller. This firmware can be used to provide fault diagnosis. Special firmware may also be loaded to handle difficult environments. Technicians at a remote location can interact with a given TSS, including loading and testing firmware, and firmware bugs can be fixed remotely.

Various controller functions can be implemented from a remote location. For example, automatic frequency firmware can be initiated to test various operating frequencies of a TSS and select the frequency that results in a maximum signal-to-noise ratio. A remote system can change a bias and monitor results, and further change the characteristics of signal filters or change the time constant with which the TSS adapts to its environment, such as changes in parasitic capacitance or ambient light. A remote system can initiate a built-in self-test of a TSS. Other capabilities include remote firmware tuning and remote electronics calibration. Connectivity between the TSS controller and sensor can be checked remotely. A TSS can be recalibrated using built-in calibration or remote touch simulation when the TSS operating environment changes, such as when moving from cold to warm environments. These and other capabilities will now be described in the context of the following, non-limiting embodiments.

Turning now to FIG. 1, there is shown an embodiment of a touch screen system which employs a remote touch simulation capability in accordance with an embodiment of the present invention. The TSS 20 shown in FIG. 1 includes a touch screen sensor 22, which is communicatively coupled to a controller 26. The controller 26 includes at least electronic circuitry 25 (e.g., front end electronics) that applies signals to the touch screen sensor 22 and measures signals or signal changes. In more robust configurations, the controller 26 can further include a microprocessor 27 in addition to front end electronics 25. In a typical deployment configuration, the sensor 22 is used in combination with a display 24 of a host computing system 28 to provide for visual and tactile interaction between a user and the host computing system 28.

It is understood that the sensor 22 can be implemented as a device separate from, but operative with, a display 24 of the host computing system 28. Alternatively, the sensor 22 can be implemented as part of a unitary system which includes a display device, such as a plasma, LCD, or other type of display technology amenable to incorporation of the sensor 22. It is further understood that utility is found in a system defined to include only the sensor 22 and controller 26 which, together, can implement touch simulation methodologies of the present invention.

In the illustrative configuration shown in FIG. 1, communication between the sensor 22 and the host computing system 28 is effected via the controller 26. It is noted that one or more TSS controllers 26 can be communicatively coupled to one or more touch screen sensors 22 and the host computing system 28. The controller 26 is typically configured to execute firmware/software that provides for detection of touches applied to the sensor 22, execution of various calibration and diagnostic routines, and simulation of a touch to the sensor 22 in accordance with the principles of the present invention. It is understood that the functions and routines executed by the controller 26 can alternatively be effected by a processor or controller of the host computing system 28.

In one particular configuration, for example, the host computing system 28 is configured to support an operating system and touch screen driver software. The host computing system 28 can further support utility software and hardware. For example, software can be stored on the host computing system 28 which can be executed to calibrate the touch screen sensor 22 and to configure or setup the sensor 22. It will be appreciated that the various software/firmware and processing devices used to implement touch screen sensor processing and functionality in accordance with the principles of the present invention can be physically or logically associated with the TSS controller 26, host computing system 28, a remote processing system, or distributed amongst two or more of the controller 26, host computing system 28, and remote processing system.

The controller 26, which may be mounted to a separate card and removably installable within the host computing system chassis, typically includes processor and memory devices for storing and executing TSS operating firmware and communication firmware for communicating with the host computing system 28. The sensor 22 can be attached to the display 24 and include a connector interface for connecting with the controller 26. The TSS 20, as will be discussed below, further includes a communications interface for establishing a link with a remote system. An exemplary controller 26 suitable for implementing methodologies of the present invention is the 3M MicroTouch™ EX II ASIC controller, such as the EX II-based Universal Serial Bus (USB) controller, which is manufactured by the assignee of the instant application.

Figure 2A:
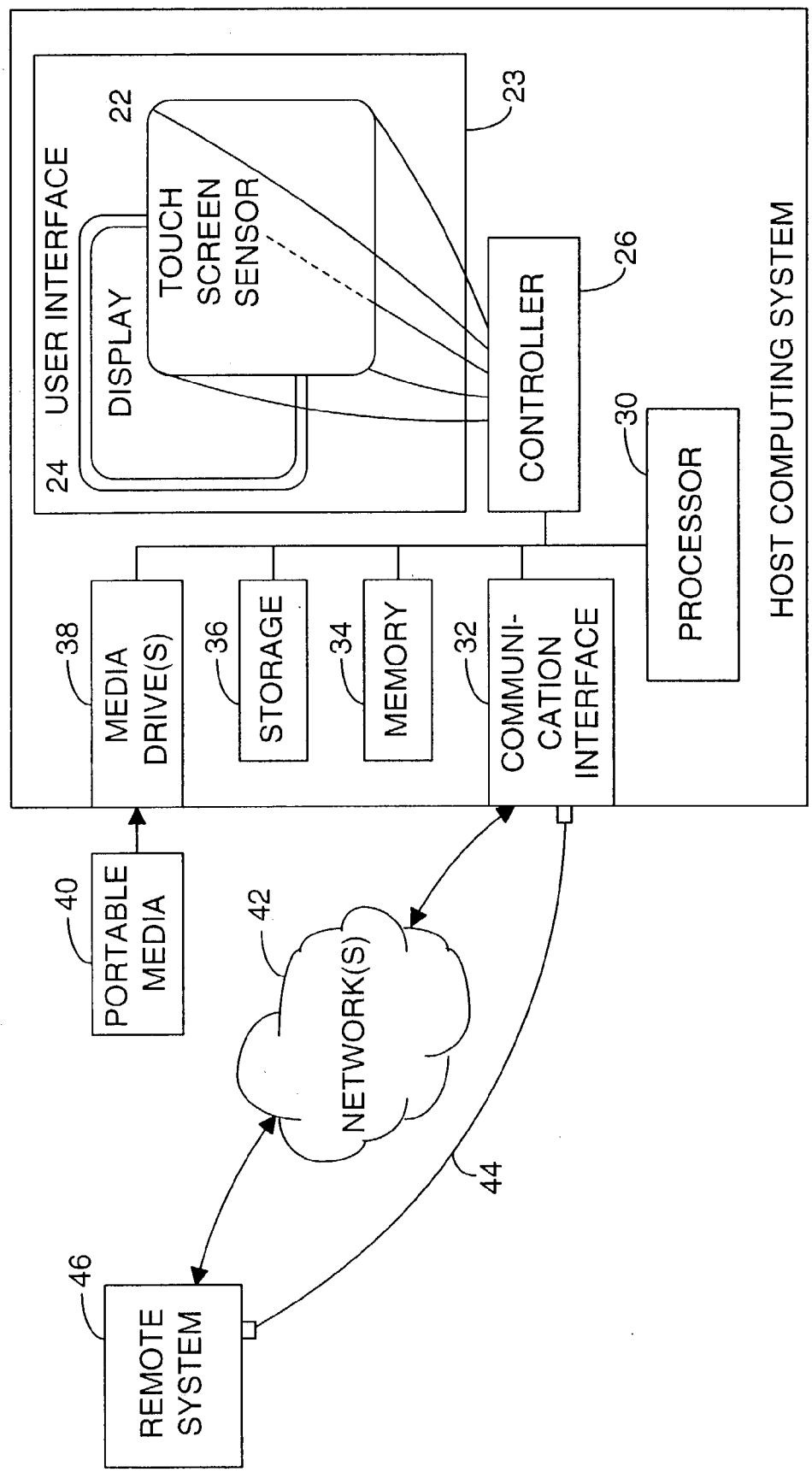
FIG. 2A is an illustration of a touch screen system which employs a remote touch simulation capability in accordance with another embodiment of the present invention.

In FIG. 2A, there is shown a more robust system environment in which a TSS and touch simulation methodology of the present invention may find utility. In accordance with this embodiment, the host computing system 28 includes a user interface 23 which incorporates a TSS 20 (e.g., as shown in FIG. 1) and a display 24. It is noted that the user interface 23 shown in FIG. 2A can include other user input or interaction devices, including a microphone and a speaker, for example. A controller 26 is shown coupled to the user interface 23. As previously discussed, the controller 26 may be implemented within the host computing system or the user interface 23.

The host computing system 28 further includes one or more media drives 38 which are configured to access (read and/or write) appropriate portable media 40. For example, the media drives 38 may includes one or more of a CD-ROM reader/writer, DVD drive, floppy drive, memory card reader/writer or other type of media drive. The host computing system 28 can also include a mass storage device 36, such as a direct access storage device (e.g., hard drive) or other form of non-volatile digital memory, and system memory 34.

Figure 2B:
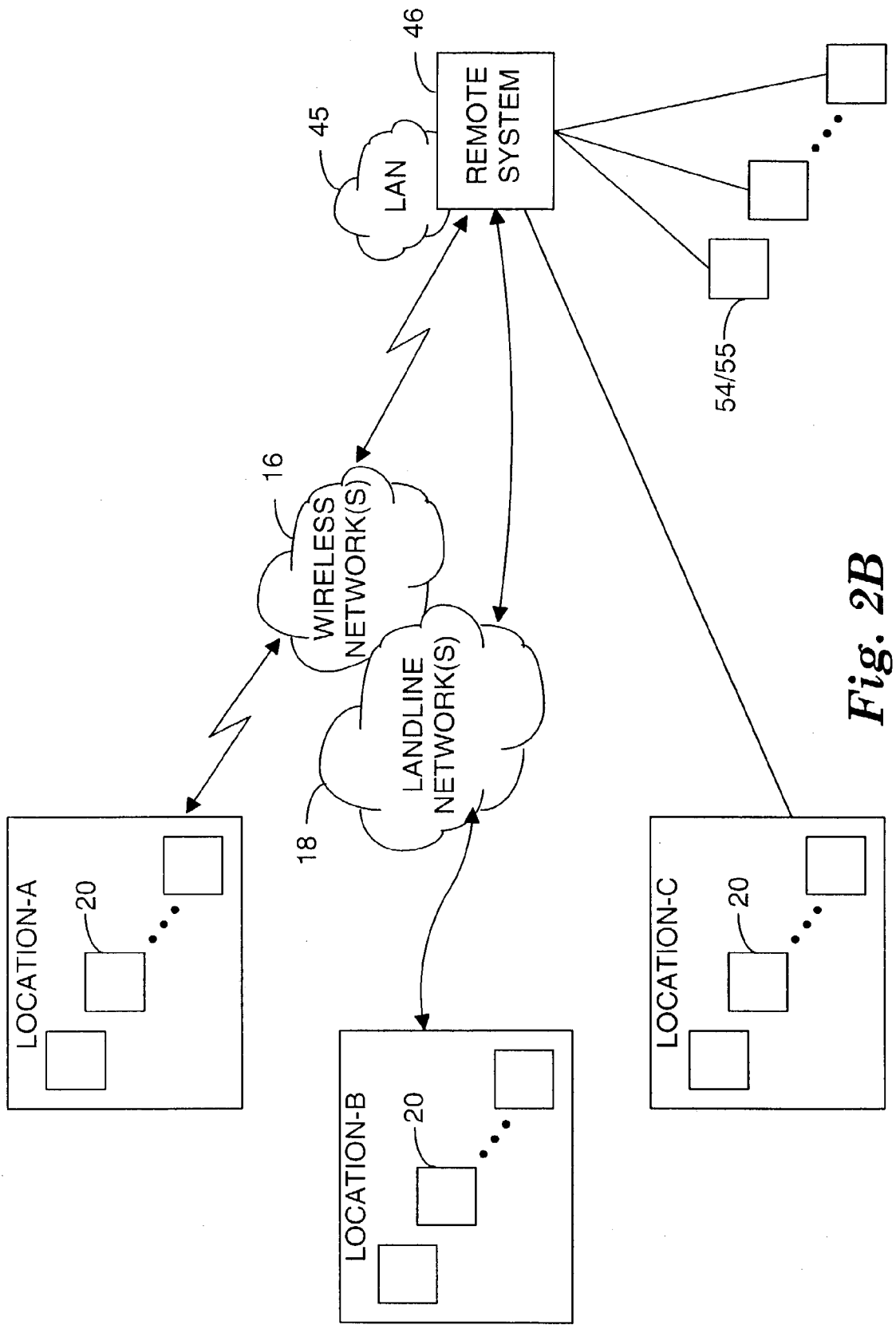
FIG. 2B is an illustration of a touch screen system which employs a remote touch simulation capability in accordance with a further embodiment of the present invention.

In the configuration shown in FIG. 2A, the host computing system 28 includes a communication interface 32 which provides an interface for communicating with a remote system 46 via a communication link. The communication interface 32 may, for example, be configured to include a network interface card (NIC) or other suitable interface for communicating with one or more networks 42, which may be landline or wireless networks 18, 16, as is further shown in FIG. 2B. For example, the communication interface 32 can be connected to a local area network 45, which can provide access to one or more public or private networks for communicating with the remote system 46. In this regard, the communication interface 32 may communicate with one or more networks 42 in conformance with known wired or wireless network architectures and protocols, including, for example, IP (e.g., IPv4 or IPv6), GSM, UMTS/IMT, WAP, GPRS, ATM, SNMP, SONET, TCP/IP, ISDN, FDDI, Ethernet or 100Base-X architectures/protocols.

The remote system 46 can interact with the host computing system 28 in a wide variety of manners depending on the desired level of services and functionality required for a given application. Such services and functionality can include one or more of remote control of the host computing system 28 and/or TSS controller 26, remote touch simulation, remote monitoring, remote diagnostics, remote calibration, and remote servicing/repair, for example. In most configurations, bi-directional communication is effected between the remote system 46 and the communication interface 32. It is understood, however, that in certain system configurations, it may only be necessary or desired to provide for uni-directional communication between the remote system 46 and the host computing system 28.

Figure 3:
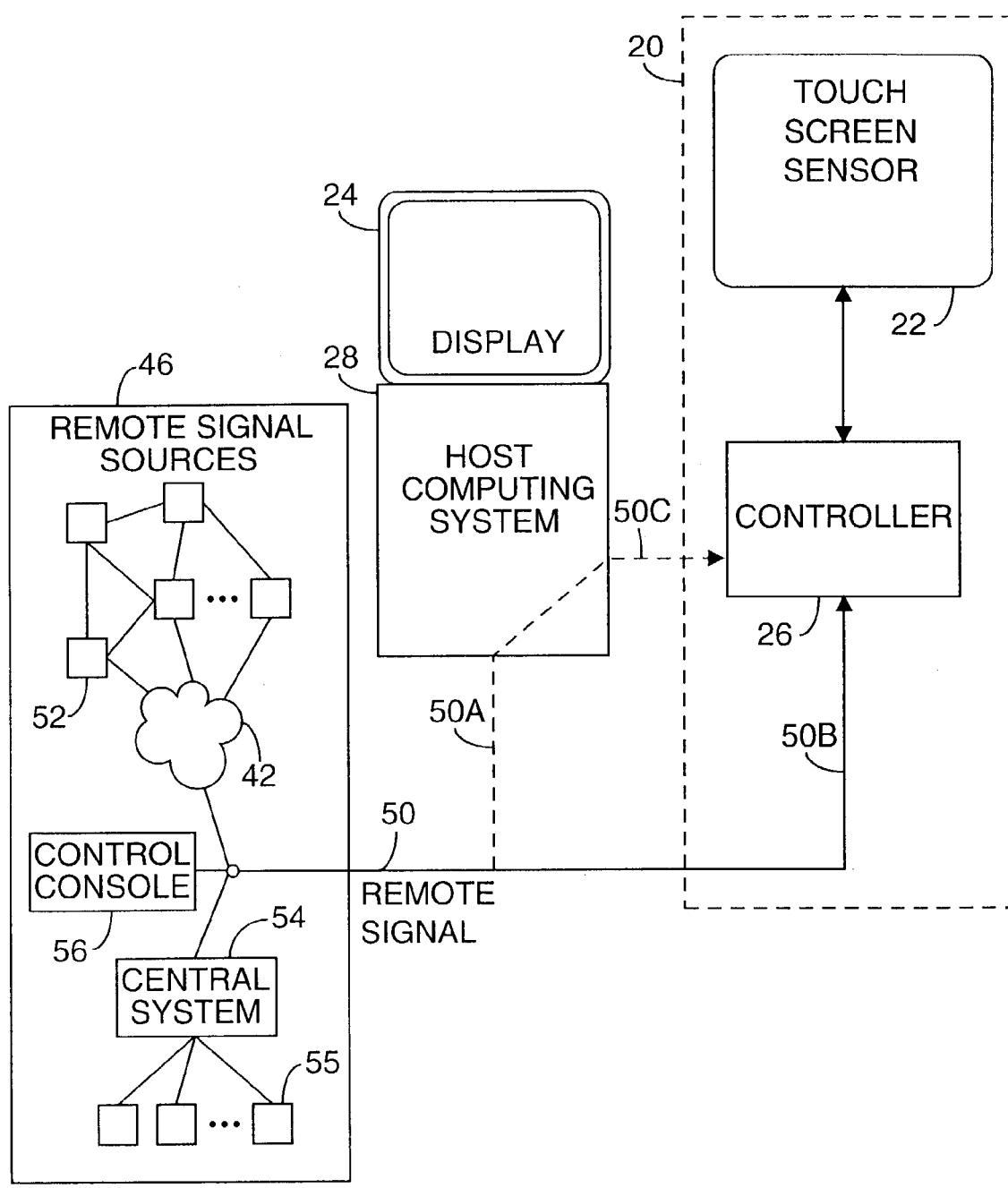
FIG. 3 illustrates a touch screen system which employs a remote touch simulation capability in accordance with another embodiment of the present invention.

Referring now to FIG. 3, there is shown a local host computing system 28 which interacts with a TSS 20 and is configured to communicate with a remote system 46. In the system configuration shown in FIG. 3, a variety of remote systems 46 are shown for purposes of illustration. The remote system 46 shown in FIG. 3, for example, can be implemented as a control console 56 situated remotely from the host computing system 28. A processing system and/or a human operator at the control console 56 can interact with the controller 26 of the TSS 20 and/or the host computing system 28 via an appropriate communication link. The remote system 46 can also be a node 52 of a network 42.

Further, the remote system 46 can be a node 55 of a central system 54. FIG. 3 further illustrates two possible communication paths by which a remote signal 50 is communicated between the remote system 46 and the TSS controller 26. According to one configuration, the remote signal 50 is communicated between the remote system 46 and TSS controller 26 via the host computing system 28. The remote signal 50 is transmitted and/or received by the host computing system 28 via link 50A. The host computing system 28 transmits and/or receives the remote signal 50 or a processed form/result of the remote signal 50 to/from the TSS controller 26 via link 50C. As such, the TSS controller 26 is indirectly linked with the remote system 46 via the host computing system 28 according to this configuration.

According to another configuration, the remote signal 50 is communicated directly between the remote system 46 and TSS controller 26. The remote signal 50 is transmitted and/or received by the TSS controller 26 via link 50B. In this configuration, the TSS controller 26 is directly linked with the remote system 46 via link 50B. The TSS controller 26 can communicate with the host computing system 28 over an appropriate connection (e.g., link 50C) if such is needed or desired to support TSS services and functionality. In yet another configuration, the remote signal 50 can be selectively directed to one or both of the host computing system 28 and TSS controller 26 via links 50A and 50B depending on the nature of the remote signal 50 and other considerations.

Figure 4:
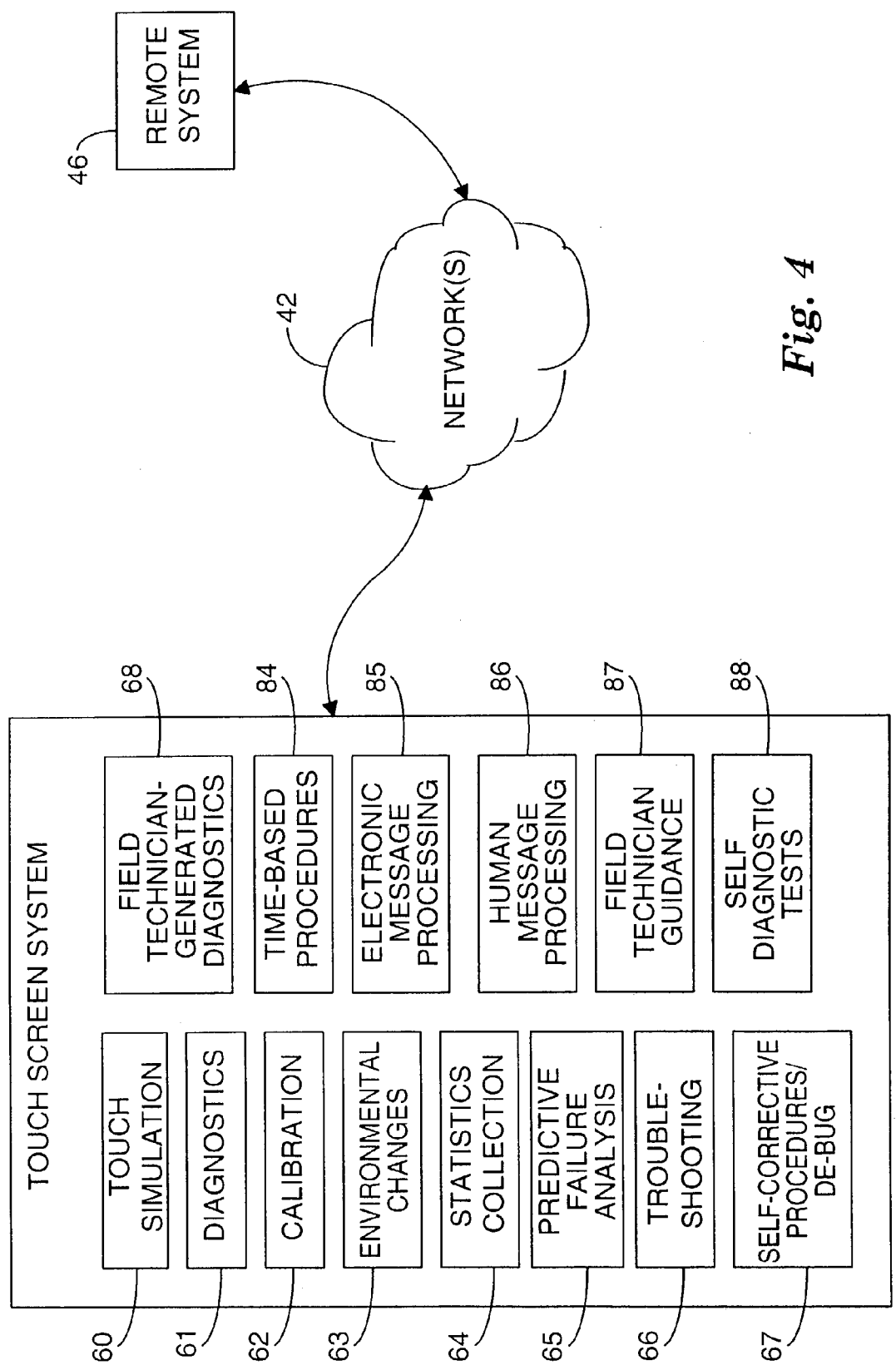
FIG. 4 depicts a number of functions associated with a touch screen system in accordance with an embodiment of the present invention.

Turning now to FIG. 4, there is shown touch screen system software functions operable by a TSS in cooperation with a remote system 46 linked to the TSS by one or more network connections 42. According to this embodiment, the touch screen system can perform a number of functions locally that involve interaction with the remote system 46. It is understood that the functions depicted in FIG. 4 represent a non-exhaustive, non-limiting listing of functional capabilities of a touch screen system, and that such functions can be implemented by software, hardware, or a combination of software and hardware. Moreover, a touch screen system of the present invention need not include all of the functions depicted in FIG. 4 and described herein, it being understood that a touch screen system of the present invention can incorporate or implement a sub-set of the functional features shown in FIG. 4.

As discussed previously and hereinbelow, a touch screen system of the present invention provides for the simulation 60 of a human touch to the touch screen sensor, which can be initiated locally by the TSS controller or host computing system, or by the remote system 46 via one or more networks 42. According to one approach, the remote system 46 communicates with the touch screen system to perform touch simulation 60 in accordance with the requirements of a particular TSS technology (e.g., capacitive, resistive, closed system capacitive, non-capacitive force, active or passive acoustic, or infrared TSS technologies).

A TSS of the present invention preferably provides for local or remote initiation of touch screen sensor diagnostic and calibration tests 61, 62 that involve the simulation of a touch by the TSS controller or a host computing system which incorporates the touch screen sensor. The remote system 46 can control or otherwise participate to enhance such diagnostic and calibration functions 61, 62.

A TSS of the present invention can include various environmental sensors (e.g., temperature, pressure, and/or humidity sensors) that provide information concerning the ambient environmental conditions in which a given TSS operates. Environmental data 63 can be acquired over time to assess the impact of environmental conditions on TSS performance as such conditions change over time. The TSS controller, for example, can modify one or more touch screen sensor parameters in response to sensed environmental conditions or changes in such conditions to improve TSS performance or to increase or decrease the level of diagnostics/calibration activity.

For example, the TSS controller can sense a change of the system's operating environment from a relatively cold and dry environment to a relatively warm and humid environment. This sensed change in environmental conditions can cause the TSS controller to increase (or decrease) the rate at which certain diagnostic or calibration functions are executed, particularly those that can detect performance changes associated with an increase in ambient temperature and humidity, in this illustrative example. Parameters affecting touch sensitivity, for example, can be modified in response to environmental changes, assuming data associating touch sensitivity to environmental conditions is made available to the TSS controller from a local or remote data source. Such data 63 can be produced from analyses involving the impact of particular environmental factors (e.g., temperature, pressure, humidity) on mechanical, electro-chemical, and/or electrical characteristics of a given TSS technology (or TSS type/model) that negatively or positive impact TSS performance.

Various statistics 64 on touch screen system performance, host computing system interaction with the TSS, and TSS/remote system interaction can be collected over time for several purposes, including detecting TSS performance changes, assessing TSS reliability, monitoring TSS servicing and repair, and evaluating historical/usage data of a given TSS. Statistics of various types can be collected by the TSS locally or the remote system 46. The remote system 46 typically acquires statistics from a number of TSSs to assess data for a population of TSSs. Collecting and evaluating such statistics for a given population of TSSs provides for detection and identification of systemic problems affecting a given TSS population, in addition to those impacting individual TSSs.

Predictive failure analysis routines 65 can be implemented to provide early warning of an impending failure, which can be addressed prior to occurrence of an actual failure event. Detection of a predicted failure condition can result in automatic invocation of diagnostic and/or calibration functions that are tailored to evaluate a given TSS failure condition. The remote system 46 can also be alerted to the predicted failure event, and remote evaluation can be performed to address the potential problem. On-site servicing can also be initiated to ensure the potential failure condition is remedied prior to an actual failure occurrence.

The TSS controller or the remote system 46 can perform predictive failure analysis by monitoring the gradual performance degradation of particular TSS components and functions. The TSS controller or the remote system 46 can analyze data from periodic internal measurements, and recommend replacement when specific thresholds are exceeded. The thresholds can be determined by examining the history logs of TSSs that have failed in actual field operation.

A touch screen system of the present invention can incorporate troubleshooting functions 66 which allow for the interrogation, testing, and evaluation of a given TSS locally and/or remotely. The troubleshooting functions 66 can be initiated locally or remotely and are tailored to identify particular TSS operating events, anomalies, and fault conditions. Self-corrective procedures and/or de-bug routines 67 can be provided/initiated to correct/repair problems identified by the troubleshooting functions 66. Self-diagnostic routines 88 can also be provided and selectively initiated to troubleshoot TSS problems. As was discussed previously, many of the functional capabilities depicted in FIG. 4 can be performed using time-based procedures 84, such that execution of the various monitoring, reporting, diagnostic, and calibration routines is orchestrated in a manner that minimizes interruption to normal TSS operations as viewed by a user.

In cases where a field technician is required to service a given TSS, diagnostic information, notes, and related commentary 68 can be transmitted to the remote system 46 and appended to the repair history of the subject TSS. This information can also be assessed by a remote technician to assist the field technician in servicing the TSS in real-time. As was discussed above, field technician guidance 87 can be effected to direct TSS problem identification and servicing by the field technician.

The TSS typically employs electronic message processing 85 to communicate various forms of electronic data to the remote system 46. Electronic message processing 85 also provides a mechanism for coordinating a dialogue between the remote system 46 and touch screen system, such as during electronic TSS troubleshooting, diagnostics, calibration, or repair, for example.

Human message processing 86 is also provided to coordinate the transfer of technician perceivable information between the TSS and remote system 46. The technician perceivable information can be in the form of textual or graphical information presented on a display to which the TSS is associated or a remote display, and can further include audible information for broadcasting via a local audio system, such as an audio system connectable to a host computing system that incorporates the TSS.

Figure 5:
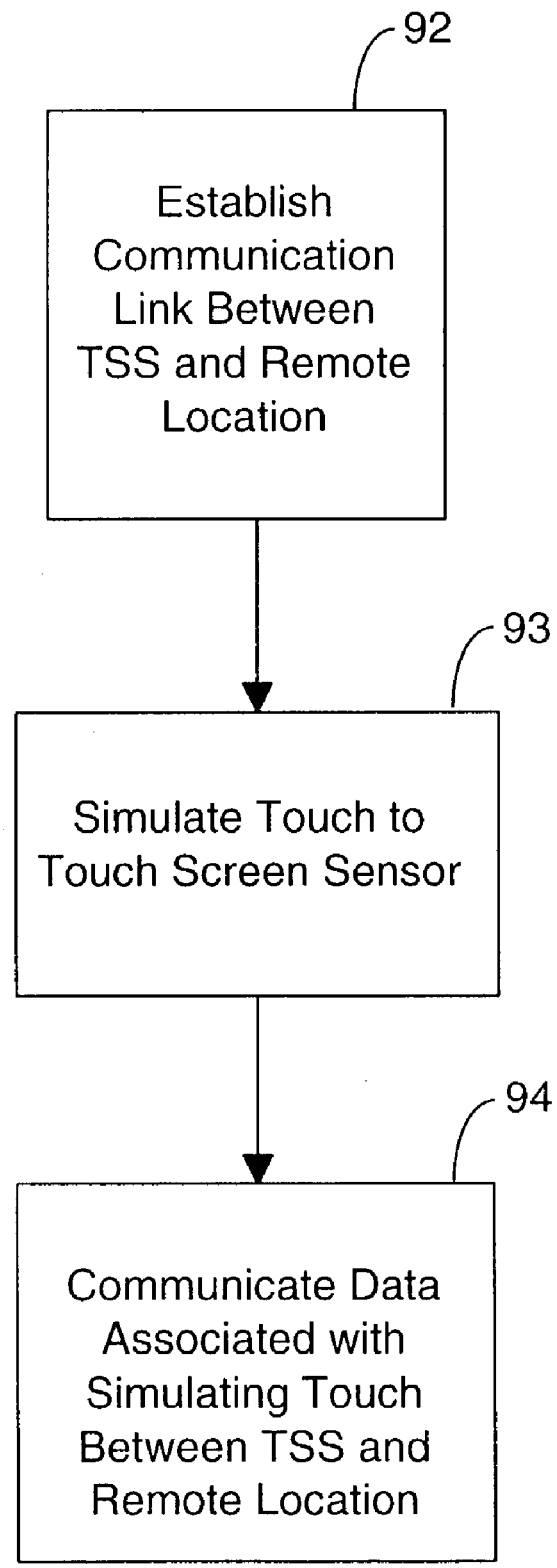
FIG. 5 is a flow diagram of a methodology for simulating a touch on a touch screen sensor involving a remote system in accordance with an embodiment of the present invention.

Referring now to FIG. 5, there is depicted various processes associated with remote touch simulation according to an embodiment of the present invention. As is shown in FIG. 5, a communication link is established 92 between a TSS or a number of TSSs and a remote location. A touch to a given TSS sensor is simulated 93, such as for purposes of performing a diagnostics or calibration function. Data associated with simulating the touch is communicated 94 between the TSS and the remote location. This data can include one or more of data transmitted from the remote location and received by the TSS, data transmitted from the TSS and received at the remote location, data transmitted bi-directionally between the TSS and remote location, and data transmitted before, during, or after touch simulation. Data associated with touch simulation can be displayed locally or at the remote location.

By way of example, communicating data associated with simulating the touch can include communicating simulation data acquired during touch simulation from the TSS to the remote location. The simulation data can be communicated between the TSS and the remote location substantially in real-time during touch simulation. Alternatively, the simulation data can be communicated between the TSS and the remote location subsequent in time to touch simulation (e.g., in a batch mode).

Establishing the communication link, in one approach, involves establishing network connectivity between the TSS and the remote location. In another approach, the TSS is communicatively coupled to a local host computing system, and a communication link is established between the TSS and the remote location via the local host computing system (e.g., an electronic kiosk).

Figure 6:
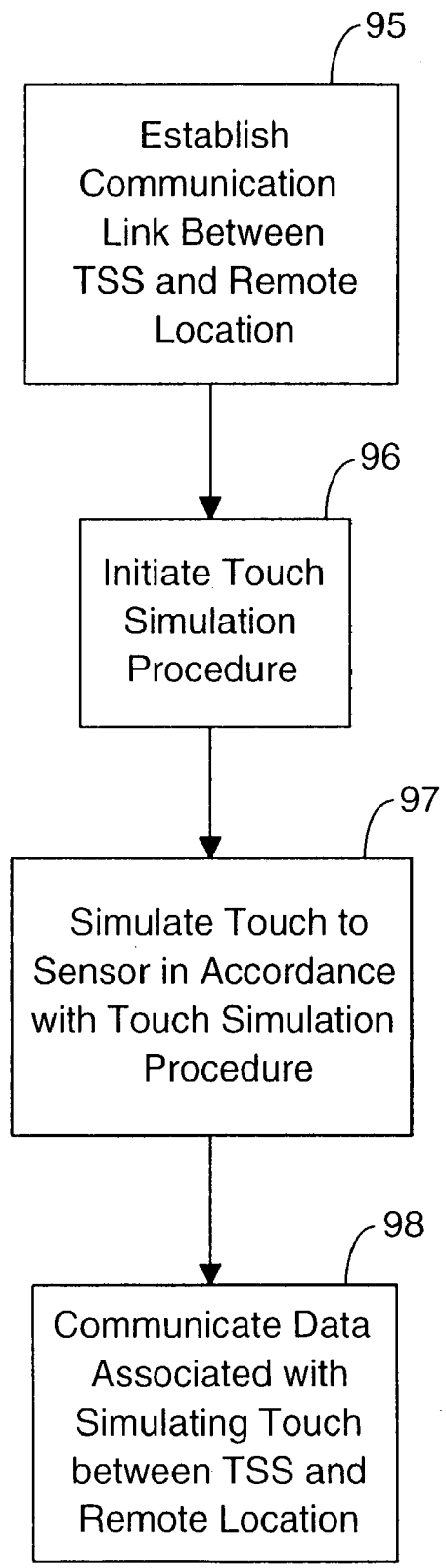
FIG. 6 is a flow diagram of a methodology for simulating a touch on a touch screen sensor involving a remote system in accordance with another embodiment of the present invention.

FIG. 6 depicts various processes associated with remote touch simulation according to another embodiment of the present invention. As is illustrated in FIG. 6, a communication link is established 95 between a TSS or a number of TSSs and a remote location. A touch simulation procedure is initiated 96. A touch to the particular TSS sensor is simulated 97 in accordance with a touch simulation procedure tailored to the subject TSS. Data associated with simulating the touch is communicated 98 between the TSS and the remote location.

The touch simulation procedure, according to this embodiment, is designed to effect remote touch simulation in accordance with requirements of a particular TSS technology. For example, touch simulation procedures can be developed for each of a variety of TSS technologies that are implicated in a given TSS network. Examples of such TSS technologies include capacitive, resistive, closed system capacitive, non-capacitive force, active or passive acoustic, and infrared TSS technologies.

Figure 7:
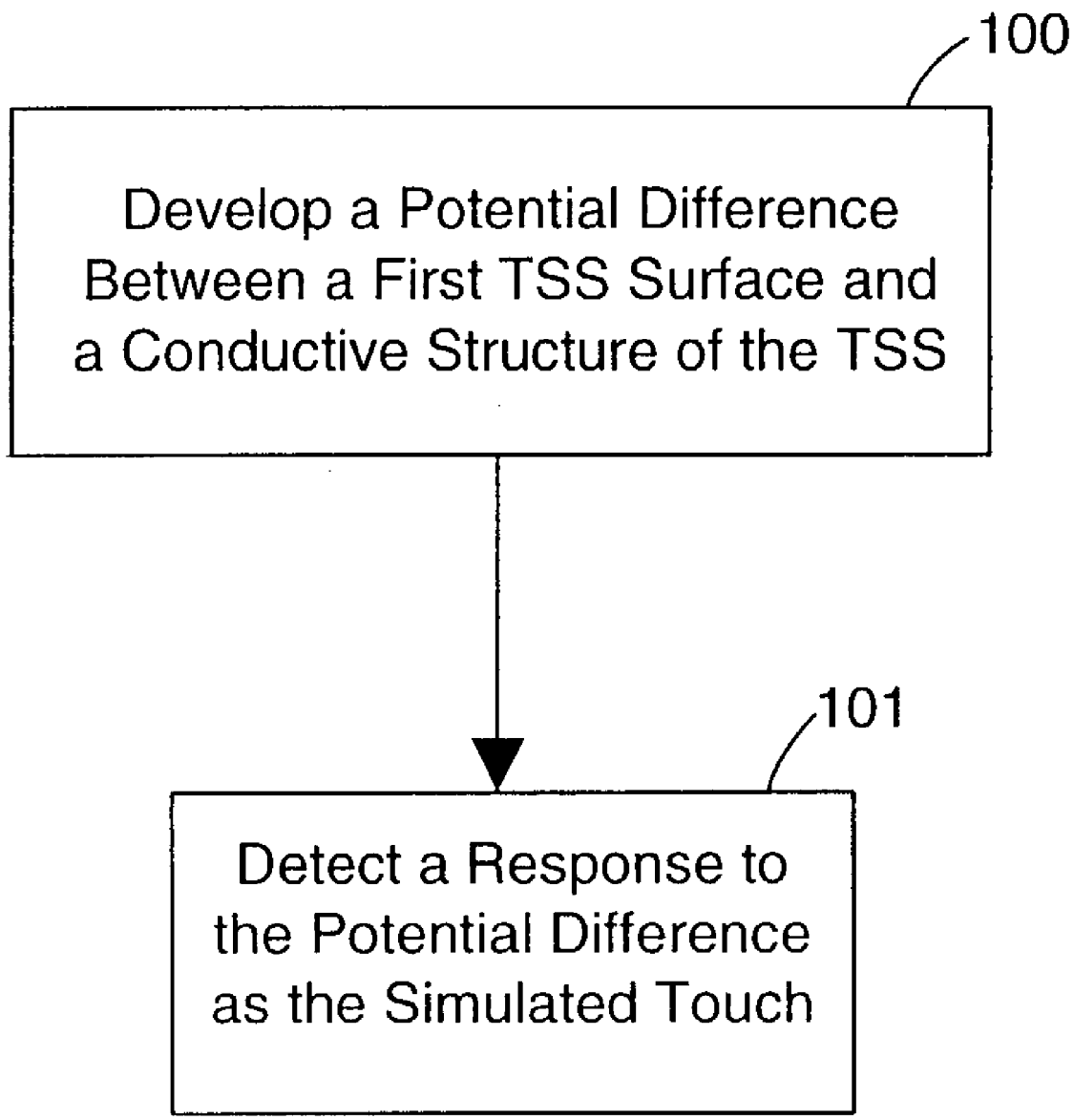
FIG. 7 is a flow diagram of a methodology for simulating a touch on a touch screen sensor in accordance with an embodiment of the present invention.

By way of example, and with respect to a capacitive TSS technology, the touch simulation procedure can involve measuring changes in current flow at corners of the touch screen sensor in response to capacitive coupling that simulates a touch to the sense surface by an object. One touch simulation procedure involves developing a potential difference between a first surface and a second surface of the touch screen sensor, and detecting a response to the potential difference as the simulated touch. In one particular approach, and as shown in FIG. 7, an electrically conductive structure is coupled to, or positioned proximate, the second surface of the TSS sensor. A potential difference is developed 100 between the first surface and the electrically conductive structure, and a response to the potential difference is detected 101 as the simulated touch.

Developing the potential difference can involve applying a first AC voltage signal and a second AC voltage signal respectively to the first and second/conductive structure surfaces, and varying a characteristic (e.g., amplitude, phase, frequency) of one of the first and second AC voltage signals relative to the other of the first and second AC voltage signals. A detected response to the potential difference can be associated with a position of the simulated touch on the touch screen sensor, a process which can be repeated to detected changes in touch position over time.

Figure 8:
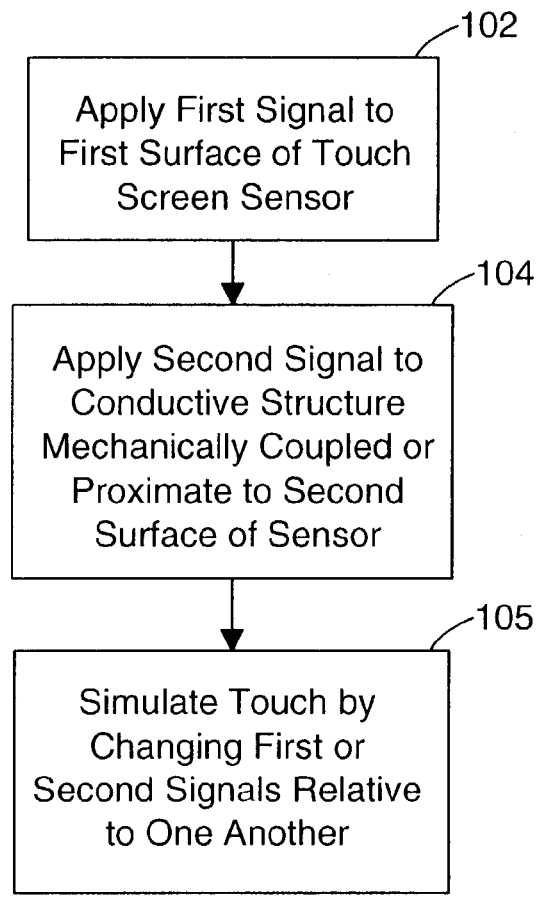
FIG. 8 is a flow diagram of a methodology for simulating a touch on a touch screen sensor in accordance with another embodiment of the present invention.

According to another capacitive TSS technology, a touch screen sensor includes a substrate having a first surface, a second surface opposing the first surface, and an electrically conductive structure coupled to, or positioned proximate, the substrate and situated proximate the second surface. A touch simulation procedure appropriate for this TSS technology, as shown in FIG. 8, involves applying 102 a first signal to the first surface of the touch screen sensor, applying 104 a second signal to the conductive structure of the touch screen sensor, and simulating 105 the touch on the touch screen sensor by changing one of the first and second signals relative to the other of the first and second signals (e.g., changing an amplitude, phase, or frequency of the first or second signal). The conductive structure can be used as a shield against electrical noise.

Figure 9:
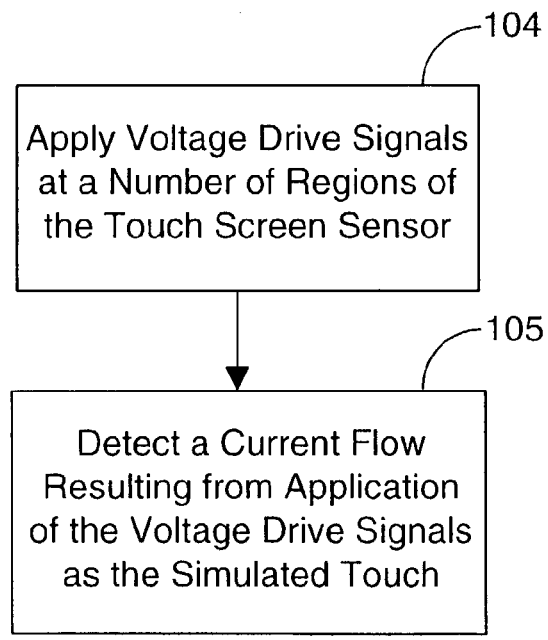
FIG. 9 is a flow diagram of a methodology for simulating a touch on a touch screen sensor in accordance with a further embodiment of the present invention.

In accordance with a further TSS technology, the touch screen sensor is configured as a capacitive touch screen sensor which includes a substrate having a first surface and a second surface opposing the first surface. A touch simulation procedure appropriate for this TSS technology, as shown in FIG. 9, involves applying 106 voltage drive signals at a number of regions of the touch screen sensor, and detecting 107 a current flow resulting from application of the voltage drive signals as the simulated touch.

The voltage drive signals, according to one approach, can have substantially equal amplitudes. In another approach, at least one of the voltage drive signals has an amplitude differing from others of the voltage drive signals. Detecting the current flow can involve detecting a change in a current flow at each of a number of corner regions of the first surface. An impedance change can be detected between one corner region of the first surface relative to other corner regions of the first surface. The applying and detecting processes can be repeated over a duration of time, and variations in the detected current flow can be monitored over the duration of time.

Figure 10:
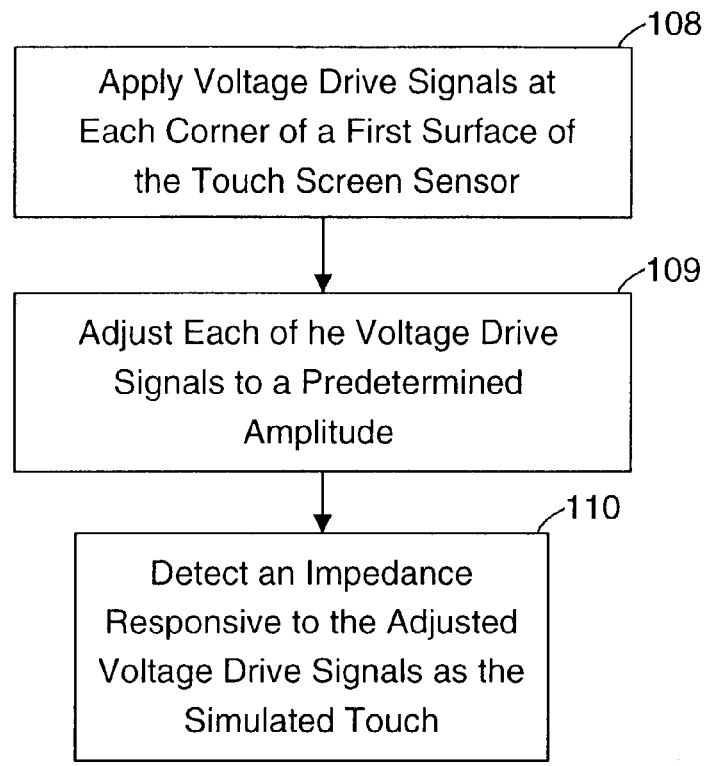
FIG. 10 is a flow diagram of a methodology for simulating a touch on a touch screen sensor in accordance with yet another embodiment of the present invention.

According to one particular approach, and as shown in FIG. 10, voltage drive signals can be applied 108 at each corner of the first surface of the touch screen sensor. Each of the voltage drive signals can be adjusted 109 to a predetermined amplitude. The simulated touch is detected 110 as an impedance change responsive to the adjusted voltage drive signals.

Figure 11:
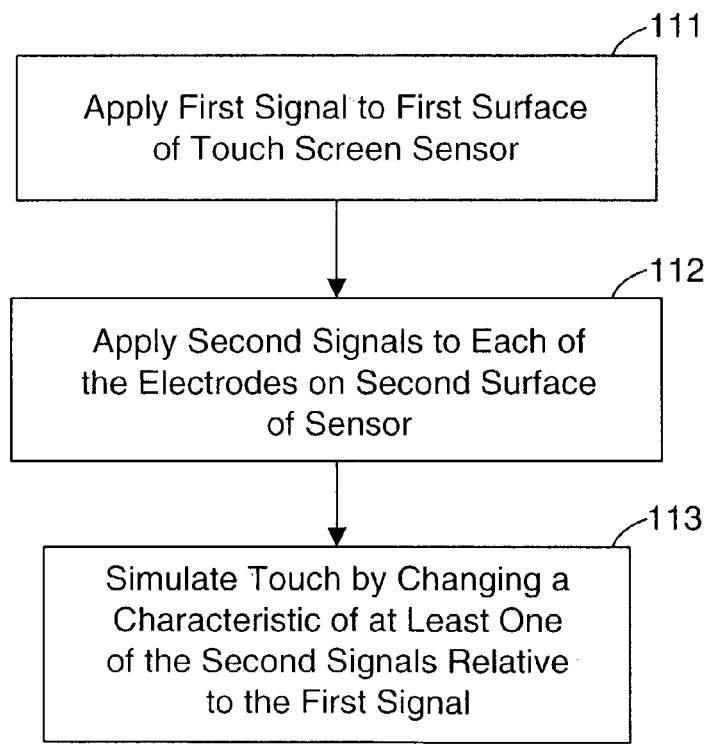
FIG. 11 is a flow diagram of a methodology for simulating a touch on a touch screen sensor in accordance with one embodiment of the present invention.

In accordance with another TSS technology, a TSS is configured to include a capacitive touch screen sensor which includes a substrate having a first surface and a second surface opposing the first surface, and a number of electrodes disposed on or proximate to the second surface. A touch simulation procedure appropriate for such a TSS technology, as shown in FIG. 11, involves applying 111 a first signal to the first surface of the touch screen sensor, applying 112 one of a plurality of second signals to each of the electrodes disposed on or proximate to the second surface, and simulating 113 the touch on the touch screen sensor by changing a characteristic of at least one of the second signals relative to the first signal.

In one approach, the characteristic can be amplitude, and each of the second signals can have substantially equal amplitudes. In another approach, at least one of the second signals has an amplitude differing from an amplitude of others of the second signals. In another approach, the characteristic can be frequency, and each of the second signals can have substantially equal frequencies. Alternatively, at least one of the second signals can have a frequency differing from a frequency of others of the second signals. In a further approach, the characteristic can be phase, and each of the second signals can have substantially the same phase. Alternatively, at least one of the second signals can have a phase differing from a phase of others of the second signals.

Figure 12:
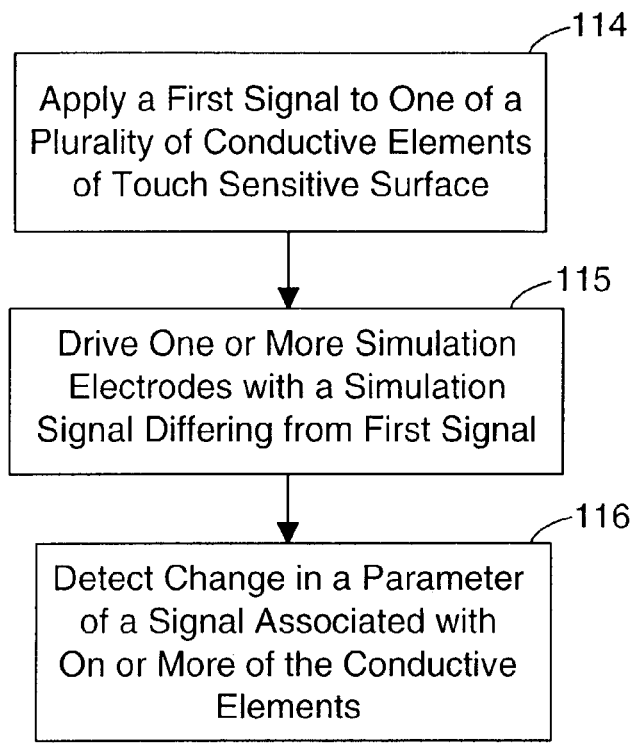
FIG. 12 is a flow diagram of a methodology for simulating a touch on a touch screen sensor in accordance with another embodiment of the present invention.

In accordance with another TSS technology, a near field imaging (NFI) touch screen sensor is configured to include a substrate having a number of electrical conductors, and a number of simulation electrodes provided proximate to the electrical conductors. A touch simulation procedure appropriate for this TSS technology, as shown in FIG. 12, involves applying 114 a first signal to at least one of the electrical conductors of the touch sensitive surface, driving 115 at least one of the simulation electrodes with a simulation signal having a characteristic (e.g., amplitude or phase) differing from that of the first signal, and detecting 116 a change in a parameter of a signal associated with at least one of the electrical conductors as the simulated touch. In one configuration, at least one of the simulation electrodes can be grounded during touch simulation.

Figure 13:
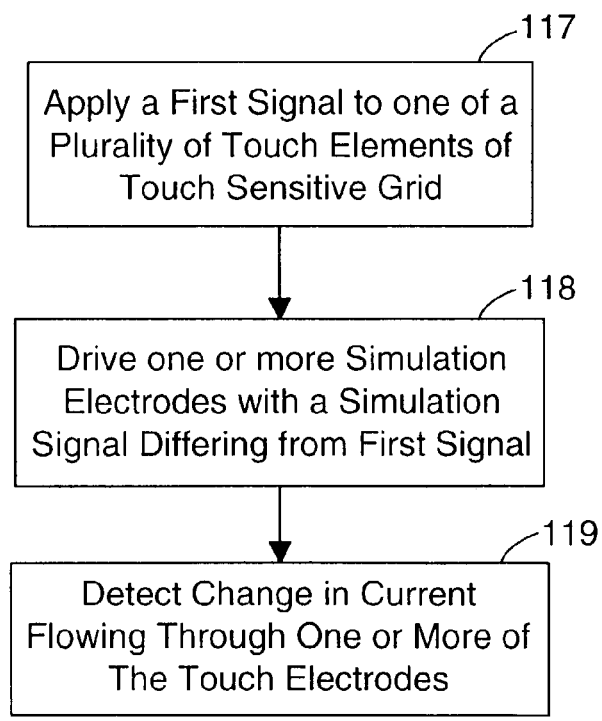
FIG. 13 is a flow diagram of a methodology for simulating a touch on a touch screen sensor in accordance with a further embodiment of the present invention.

According to another TSS technology, a touch screen sensor is configured as a grid capacitive touch screen sensor which includes a substrate having a touch sensitive grid of touch electrodes and a number of simulation electrodes provided proximate to the touch electrodes. A touch simulation procedure appropriate for this TSS technology, as shown in FIG. 13, involves applying 117 a first signal to at least one of the touch electrodes, driving 118 at least one of the simulation electrodes with a simulation signal having a characteristic (e.g., amplitude or phase) differing from that of the first signal, and detecting 119 a change in current flowing through at least one of the touch electrodes as the simulated touch. In one configuration, at least one of the simulation electrodes can be grounded during touch simulation.

Figure 14:
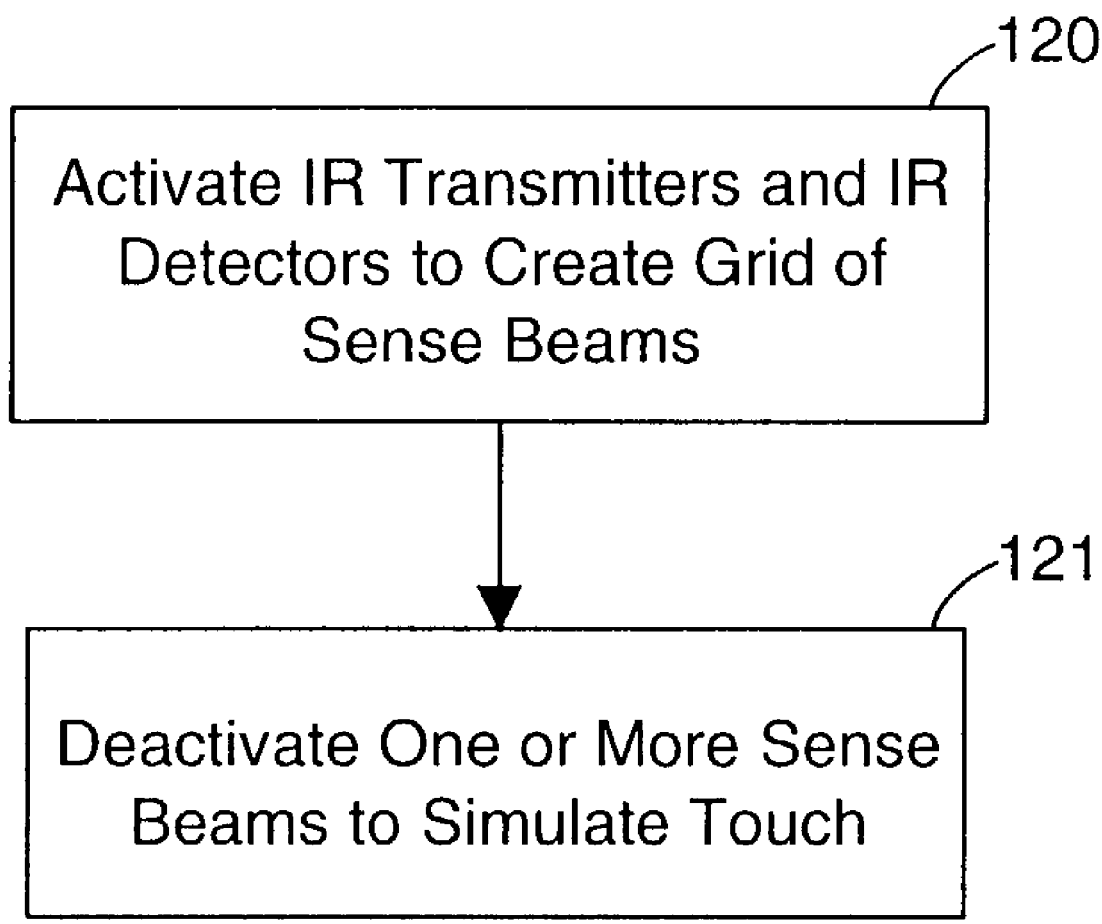
FIG. 14 is a flow diagram of a methodology for simulating a touch on a touch screen sensor in accordance with yet another embodiment of the present invention.

In accordance with yet another TSS technology, a touch screen sensor is configured as an infrared (IR) touch screen sensor which includes a frame that supports a matrix of inwardly directed IR transmitters and IR detectors. An arrangement of the IR transmitters is situated opposite a corresponding arrangement of the IR detectors. A touch simulation procedure appropriate for this TSS technology, as shown in FIG. 14, involves activating 120 the IR transmitters and IR detectors to create a grid of sense beams within the frame, and deactivating 121 one or more of the sense beams to simulate the touch at a location corresponding to the one or more deactivated sense beams.

Activating the IR transmitters can involve sequentially pulsing the IR transmitters. Deactivating the one or more sense beams can involve deactivating one or more IR transmitters associated with the one or more deactivated sense beams. Deactivating the one or more sense beams can also involve deactivating one or more IR detectors associated with the one or more deactivated sense beams.

For each of these TSS technologies, and with regard to other TSS technologies not specifically discussed hereinabove, a touch simulation procedure of the present invention can be initiated at the remote location or local to the touch screen sensor. Touch simulation can be repeated over a duration of time, and a change in a parameter, such as position of the simulated touch, can be detected over the duration of time. A message signal associated with the detected change in simulated touch parameter can be generated and communicated to the remote location via the communication link.

A result of the touch simulation can be compared to one or more predetermined limits, and the result exceeding the one or more predetermined limits can be used to assess operational fitness of the touch screen sensor. A current result of the touch simulation can be compared to one or more previously measured results of the touch simulation, and a deviation between the current result and the previously measured results by a predetermined amount can be used to assess operational fitness of the touch screen sensor. A result of the touch simulation can be used to compensate for inaccuracies or lack of sensitivity of the touch screen sensor or a TSS incorporating the touch screen sensor.

Figure 15:
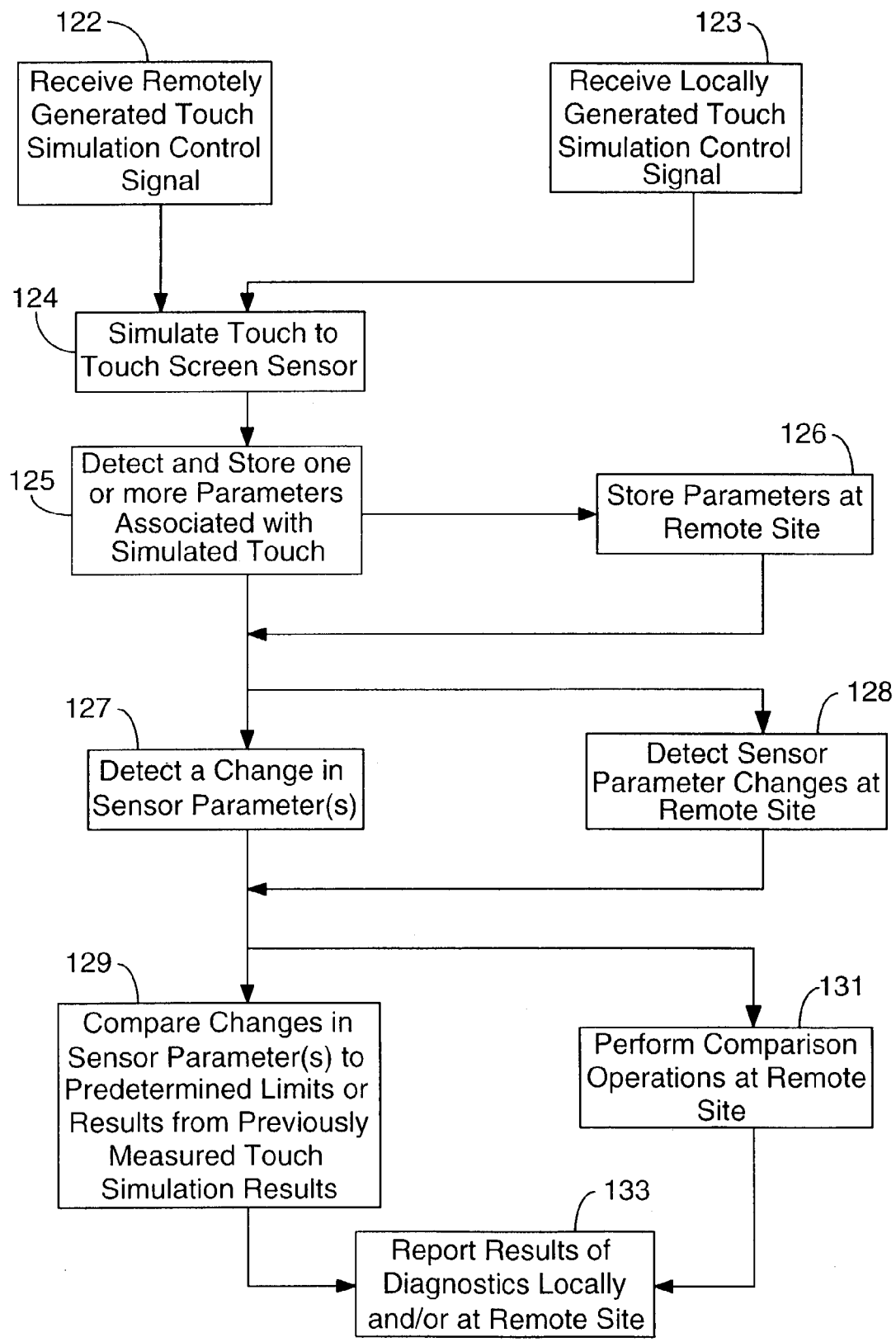
FIG. 15 is a flow diagram of a methodology for remotely or locally initiating simulation of a touch on a touch screen sensor in accordance with an embodiment of the present invention.

By way of particular example, and as shown in the embodiment illustrated in FIG. 15, touch simulation can be initiated, monitored, and controlled locally, remotely, or both locally and remotely. As shown in FIG. 15, a remotely or locally generated touch simulation control signal is received 122, 123 by the controller of the TSS. A simulated touch is produced 124 in a manner appropriate for the subject TSS technology as previously discussed. One or more parameters associated with the simulated touch are detected and stored 125. A non-exhaustive list of such parameters include change in current, impedance, phase, voltage, or frequency; or a change in the relationship (e.g., ratio) of currents, impedances, phases, voltages, or frequencies. The parameters may be stored locally or at the remote site 126.

The parameters associated with touch simulation are acquired over a period of time. In one approach, the TSS controller or processor of a host computing system analyzes the stored touch simulation parameters and detects a change, if any, in such parameters. It is noted that this analysis may also be performed at the remote site. A change in a given touch simulation parameter beyond a predetermined limit or range can be indicative of a problem with the touch screen sensor, such as a change in touch detection accuracy. Analysis and detection of the sensor parameters can be performed locally 127, remotely 128, or cooperatively at local and remote sites.

For example, a change detected in a particular TSS sensor parameter can be compared 129 to a predetermined limit or result established from a previously measured touch simulation limit or result. The comparison operation can be performed locally, remotely 131, or cooperatively at local and remote sites. Results from a diagnostics procedure performed at the TSS can be stored and reports generated 133 locally and/or at the remote site.

Figure 18:
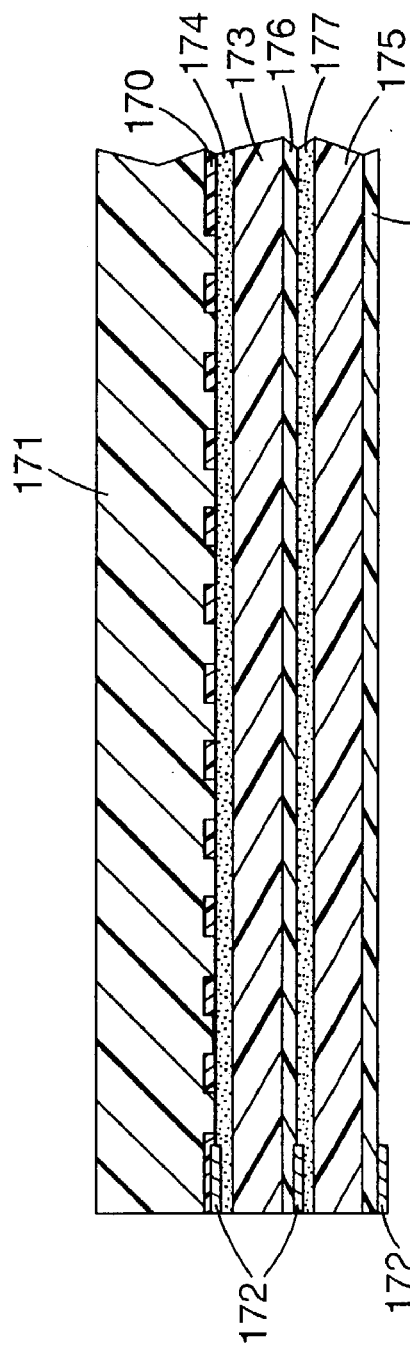
FIG. 18 is a sectional view of a grid capacitive touch screen sensor in accordance with an embodiment of the present invention.
Figure 19:
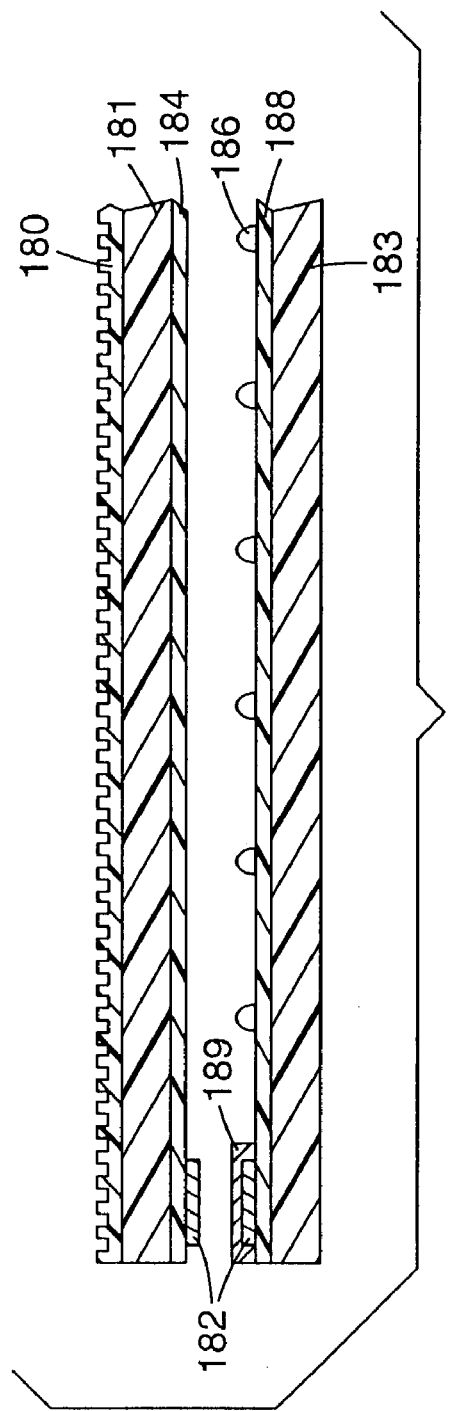
FIG. 19 is a sectional view of a resistive touch screen sensor in accordance with an embodiment of the present invention.
Figure 20:
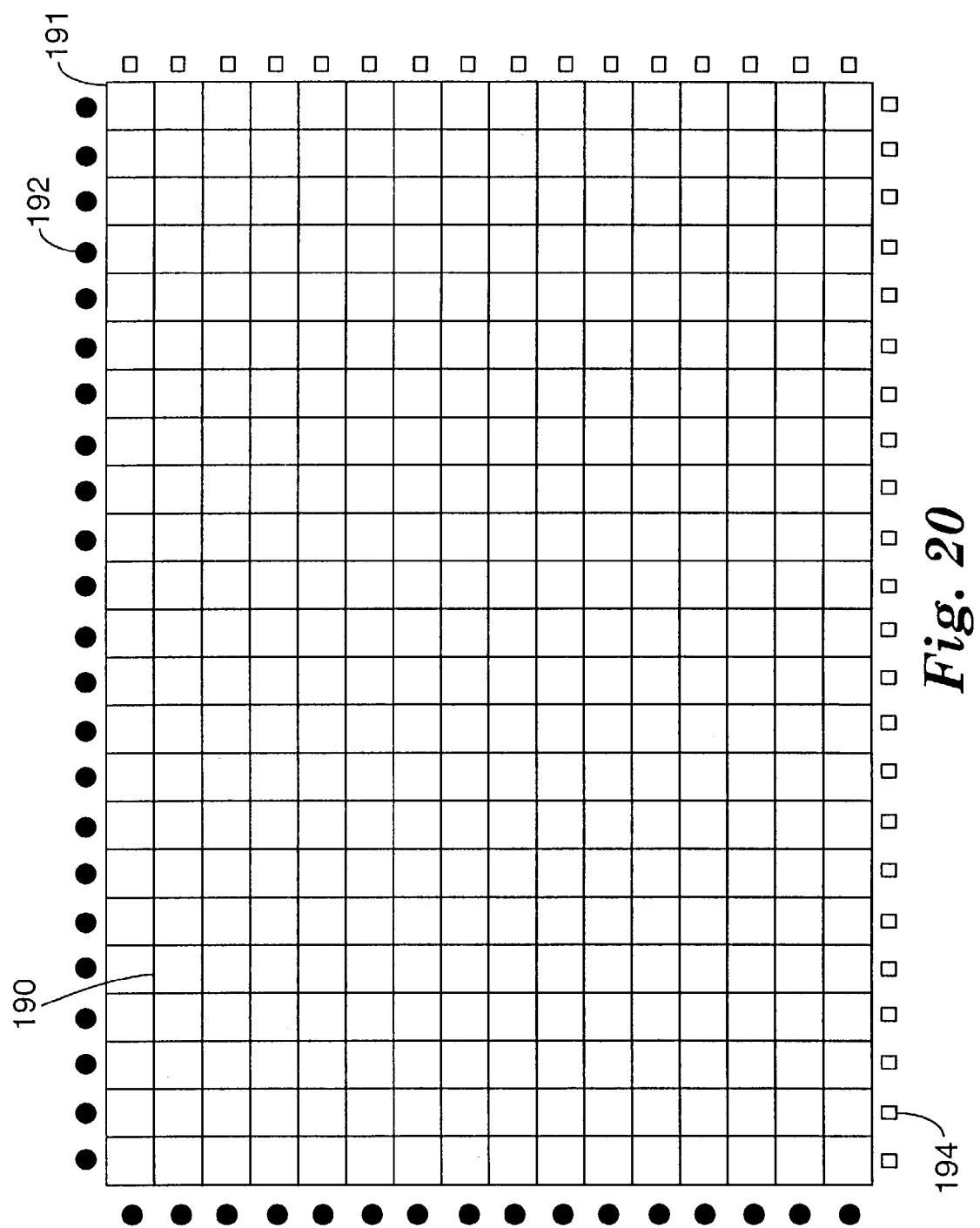
FIG. 20 is a sectional view of an infrared touch screen sensor in accordance with an embodiment of the present invention.

Remote touch simulation methodologies of the present invention, as discussed above, can be implemented in a wide range of touch screen sensor technologies. FIGS. 16–20 illustrate touch screen sensors for a variety of different TSS technologies with which remote touch simulation methodologies of the present invention can be implemented. In particular, FIG. 16 illustrates a capacitive TSS sensor. A near field imaging (NFI) capacitive TSS sensor is depicted in FIG. 17. A grid capacitive TSS sensor is shown in FIG. 18. FIG. 19 illustrates a resistive TSS sensor. An infrared TSS sensor is depicted in FIG. 20.

One embodiment of a capacitive TSS sensor is depicted in FIG. 16. The capacitive TSS sensor shown in FIG. 16 includes a capacitive substrate 155 sandwiched between a touch surface 156 (e.g., tin-antimony-oxide (TAO)) and a shield surface 158, such as an indium-tin-oxide (ITO) surface. An anti-glare surface 150 is provided over then touch surface 156. Electrodes 152 are disposed on the touch and shield surfaces 156, 158 respectively above and below the capacitive substrate 155.

An embodiment of an NFI capacitive TSS sensor is depicted in FIG. 17. The NFI capacitive TSS sensor shown in FIG. 17 includes an NFI substrate 161 positioned above a first transparent pressure sensitive adhesive (PSA) layer 160. Conductive ITO bars 164 define the touch sensitive surface of the TSS sensor. A first conductive polyester layer (e.g., PET) 163 is disposed adjacent the touch sensitive surface 164. Adjacent the first conductive polyester layer 163 are second transparent PSA layer 166, ITO shield layer 168, and second conductive polyester layer 165, respectively. Electrodes 162 are disposed on the touch sensitive surface 164 and between the PSA and ITO shield layers 166, 168, respectively. Additional details of an NFI capacitive TSS sensor of the type depicted in FIG. 17 are disclosed in U.S. Pat. No. 5,650,597 and in commonly owned U.S. Ser. Nos. 09/998,614; 10/176,564; and 10/201,400, which are hereby incorporated herein by reference in their respective entireties.

FIG. 18 illustrates an embodiment of a grid capacitive TSS sensor, which is shown to include a grid capacitive substrate 171. A first touch surface (e.g., ITO) 170 is disposed adjacent the grid capacitive substrate 171. Positioned adjacent the first touch surface 170 are first PSA layer 174 followed by first conductive polyester or glass layer 173. A second touch surface (e.g., ITO) 176 is situated adjacent the first conductive polyester or glass layer 173. Adjacent the second touch surface 176 is a second PSA layer 177 and a second conductive polyester or glass layer 175, followed by an ITO shield layer 178. Electrodes 172 are disposed on the first and second touch sensitive surfaces 170, 176 and on the lower surface of the ITO shield layer 178, respectively. Additional details of grid capacitive touch screen sensors of the type depicted in FIG. 18 are disclosed in commonly owned U.S. Pat. Nos. 4,686,332 and 5,844,506, for example, which are hereby incorporated be reference.

FIG. 19 is an illustration of a resistive TSS sensor in accordance with an embodiment of the present invention. As shown in FIG. 19, the resistive TSS sensor includes a resistive substrate 183 on which a first ITO layer 188 is disposed. A number of spacer dots 186 are provided on the first ITO layer 188. A first electrode 182 is disposed on the first ITO layer 188 and covered by a spacer structure 189. A top sheet structure of the resistive TSS sensor includes a conductive polyester (e.g., PET) layer 181 sandwiched between a hardcoat layer 180 and an ITO layer 184, which defines the touch sensitive surface of the sensor. A second electrode 182 is disposed on a lower surface of ITO layer 184.

An infrared TSS sensor is depicted in FIG. 20 in accordance with an embodiment of the present invention. According to this embodiment, the TSS sensor includes a frame 191 that supports a matrix of inwardly directed IR transmitters 192 and IR detectors 194. The frame 191 supports a horizontally orientated row of IR transmitters 192 situated opposite a corresponding row of horizontally oriented IR detectors 194. The frame 191 further supports a vertically orientated column of IR transmitters 192 situated opposite a corresponding column of vertically oriented IR detectors 194. The IR transmitters 192 are typically LEDs.

FIGS. 21–27 depict certain capacitive TSS sensor embodiments of the present invention in greater detail. The embodiments illustrated in FIGS. 21–27 and accompanying description are intended to provide an enhanced appreciation of the touch simulation structures and methodologies of the present invention, and are not intended to limit the scope or application of the such structures and methodologies.

Figure 21:
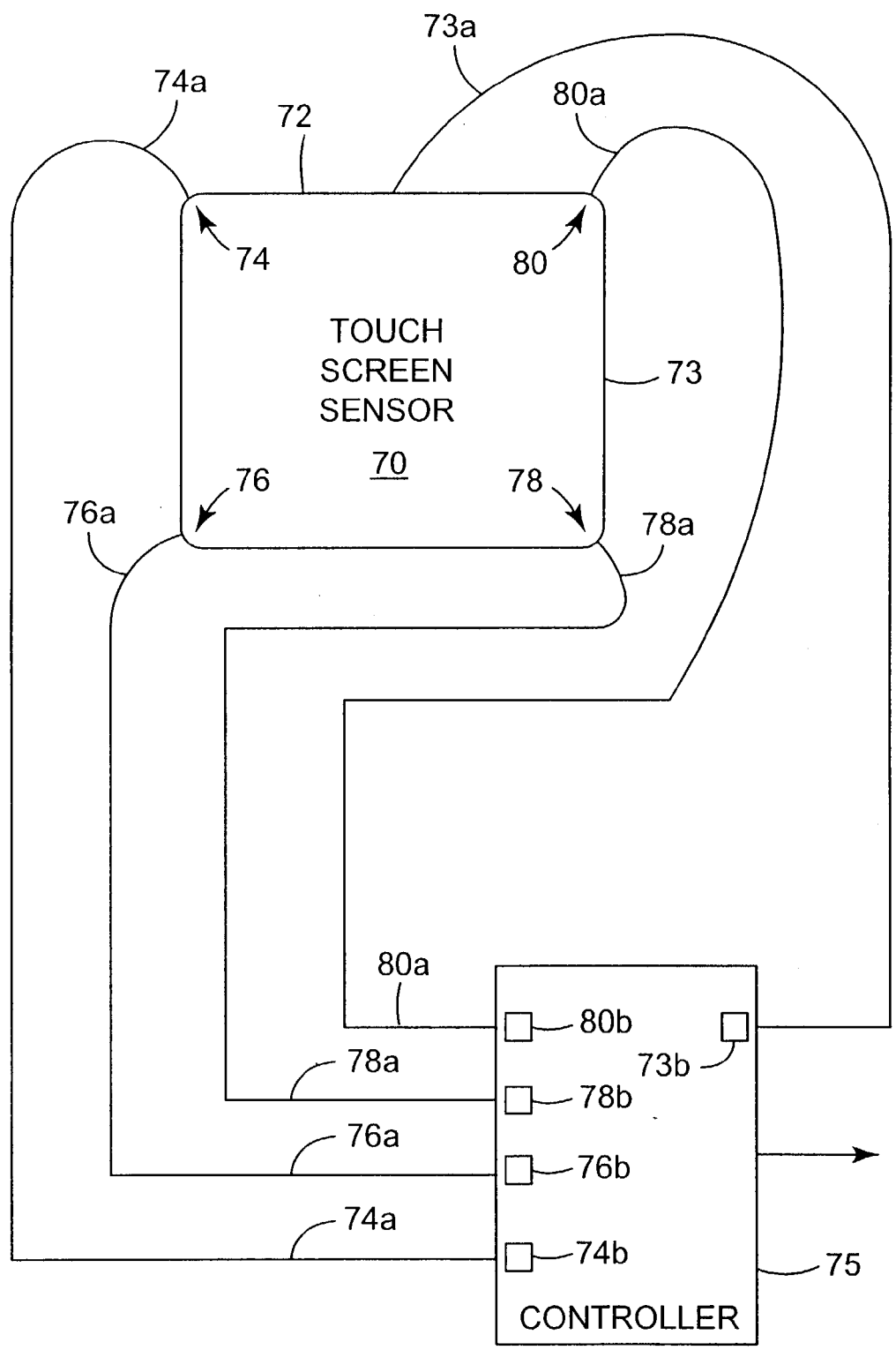
FIG. 21 illustrates a touch screen system in accordance with an embodiment of the present invention.

In FIG. 21, there is shown a TSS which includes a capacitive touch screen sensor 70 electrically coupled to a controller 75 in accordance with an embodiment of the present invention. As was discussed previously, the controller 75 can be configured to include front end electronics alone or in combination with a microprocessor. According to this embodiment, the touch screen sensor 70 includes a substrate 72, such as glass, which has top and rear surfaces 72, 73 respectively provided with an electrically conductive coating. The top surface 72 is the primary surface for sensing touch. The top surface 72 is nominally driven with an AC voltage in the range of about 2.5 V to about 5.0 V. The rear surface 73, which is often referred to as a backshield (e.g., electrical noise shield), is usually driven with the same voltage as the top surface 72 so that the effective capacitance between the top and rear surfaces 72, 73 is reduced to nearly zero.

The sensor 70 is shown to include four corner terminals 74, 76, 78, 80 to which respective wires 74a, 76a, 78a, 80a are attached. Each of the wires 74a, 76a, 78a, 80a is coupled to the TSS controller 75. The wires 74a, 76a, 78a, 80a connect their respective corner terminals 74, 76, 78, 80 with respective drive/sense circuits 74b, 76b, 78b, 80b provided in the controller 75. An additional wire 73a connects a terminal (not shown) disposed on the rear surface 73 with a drive/sense circuit 73b in the controller 75.

The controller 75 controls the voltage at each of the corner terminals 74, 76, 78, 80 and the rear terminal via drive/sense circuits 74b, 76b, 78b, 80b, 73b to maintain a desired voltage on the top and rear surfaces 72, 73. During normal operation, the controller 75 maintains the top and rear surface voltages at substantially the same voltage. A finger or stylus touch force applied to the top surface 72 is detected as an effective small capacitor applied to the top surface 72. The location of the touch on the top surface 72 is determined by current flow measurements made by the controller 75 via corner drive/sense circuits 74b, 76b, 78b, 80b in a manner known in the art.

The controller 75 can control the drive/sense circuits 74b, 76b, 78b, 80b, and 73b in a variety of manners in order to simulate a touch on the touch screen sensor 70. As will be described in greater detail, touch simulation can be initiated, monitored, and controlled locally and/or remotely.

According to one approach, the controller 75 simulates the effect of a touch to sensor 70 by adjusting the top and rear surface voltages to develop a potential difference between the top and rear surfaces 72, 73. Developing a potential difference in this manner forces a capacitive effect between the top and rear surfaces 72, 73, which is detected by current flow measurements made at the four corner terminals 74, 76, 78, 80 by the controller 75.

For example, the top surface 72 can be maintained at a nominal operating voltage and the voltage of rear surface 73 can be reduced from the nominal operating voltage, such as to about 0 V for example. The capacitive effect resulting from the potential difference developed between the top and rear surfaces 72, 73 is detected as an effective or simulated touch located approximately at the center of the top surface 72. When this touch simulation process is repeated over time, changes in the detected location of the simulated touch can indicate changes in the accuracy of the touch screen sensing system.

Figure 22:
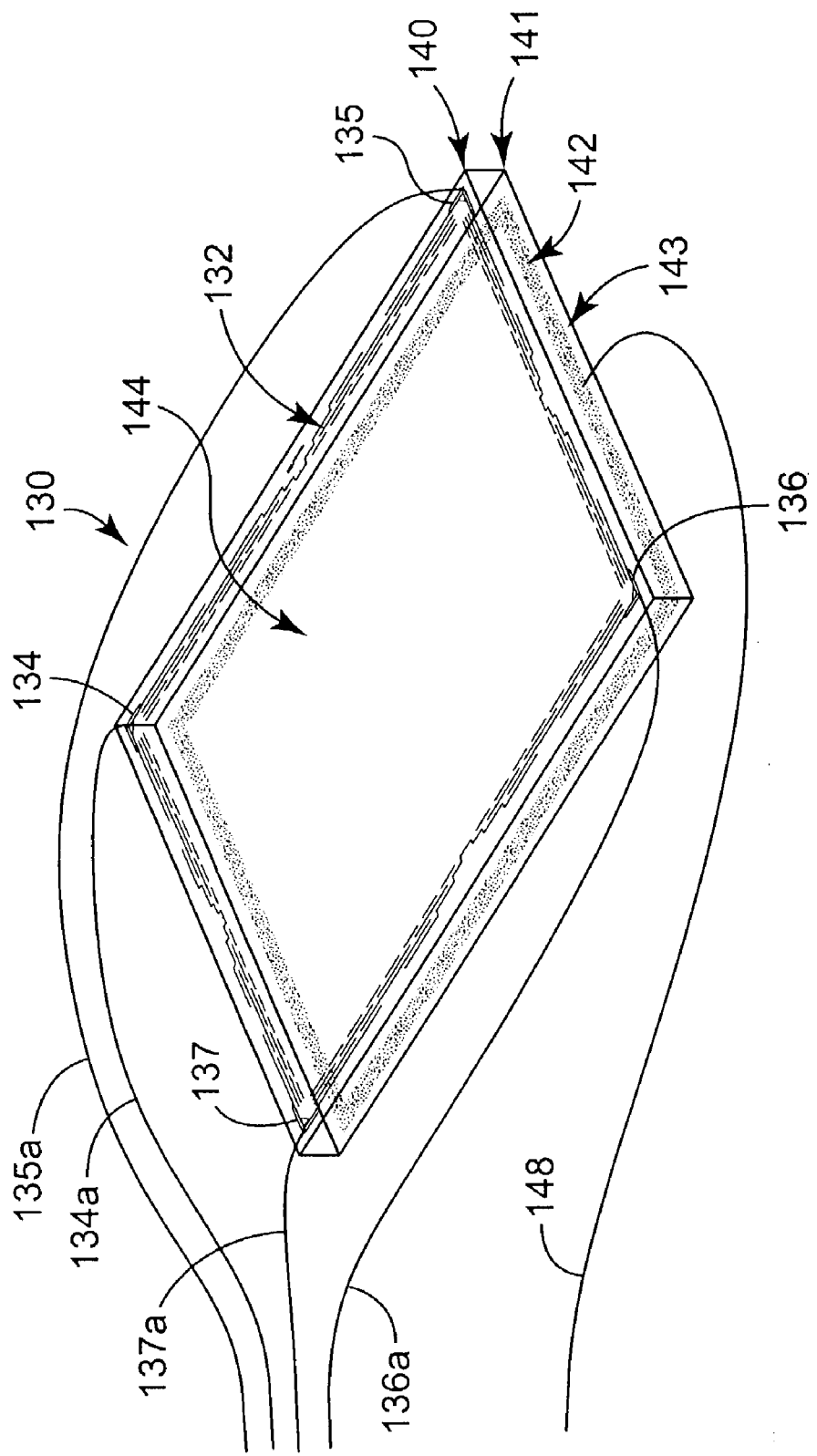
FIG. 22 is an illustration of a capacitive touch screen sensor configuration which employs a single rear electrode in accordance with an embodiment of the present invention.

In FIG. 22, there is shown another capacitive touch screen sensor configured in accordance with an embodiment of the present invention. According to this configuration, the touch screen sensor 130 includes a linearization electrode pattern 132 connected to a top resistive layer 144 which are respectively provided on a top surface 140 of the sensor 130. The linearization electrode pattern 132 is configured to have a generally rectangular shape with four corner terminals 134, 135, 136, 137 respectively connected to a TSS controller (not shown) via wires 134a, 135a, 136a, 137a. A rear electrode 142 makes electrical contact with a rear resistive layer 143 respectively provided on a rear surface 141 of the sensor 130.

In normal operation, drive signals are applied to the corner terminals 134, 135, 136, 137 via respective drive circuits in the controller, and the controller measures currents flowing through the corner terminals 134, 135, 136, 137 via respective sense circuits in the controller. Touch position is then calculated from the measured currents using known methods.

The corner terminals 134, 135, 136, 137 are typically driven with an AC voltage, and the linearization electrodes 132 distribute the voltage evenly across the top resistive layer 144. The rear electrode 142 and rear resistive layer 143 are typically driven with an AC voltage equal to and in phase with the voltage driving corner terminals 134, 135, 136, 137. As such, the rear resistive layer 143 serves as a shield against noise and also minimizes parasitic capacitance effects because negligible capacitive current flows from top resistive layer 144 to rear resistive layer 143. If the voltage on the rear resistive layer 143 is made unequal to that on the top resistive layer 144, an equal change in current flow at corner terminals 134, 135, 136, 137 will result in an apparent touch to the center of the top surface 140 of sensor 130. This simulated touch can be used for diagnostic, calibration, and repair purposes, such as those described herein.

According to a variation of the touch screen sensor configuration depicted in FIG. 22, the sensor 130 can include a rear electrode 142 without inclusion of a rear resistive layer 143. In this configuration, the rear electrode 142 can be used as a partial shield below the linearization electrode pattern 132, which is a highly sensitive area of the touch screen sensor 130. Simulating a touch in the absence of a rear resistive layer 143 is effected by changing the voltage driven onto the rear electrode 142.

Figure 23:
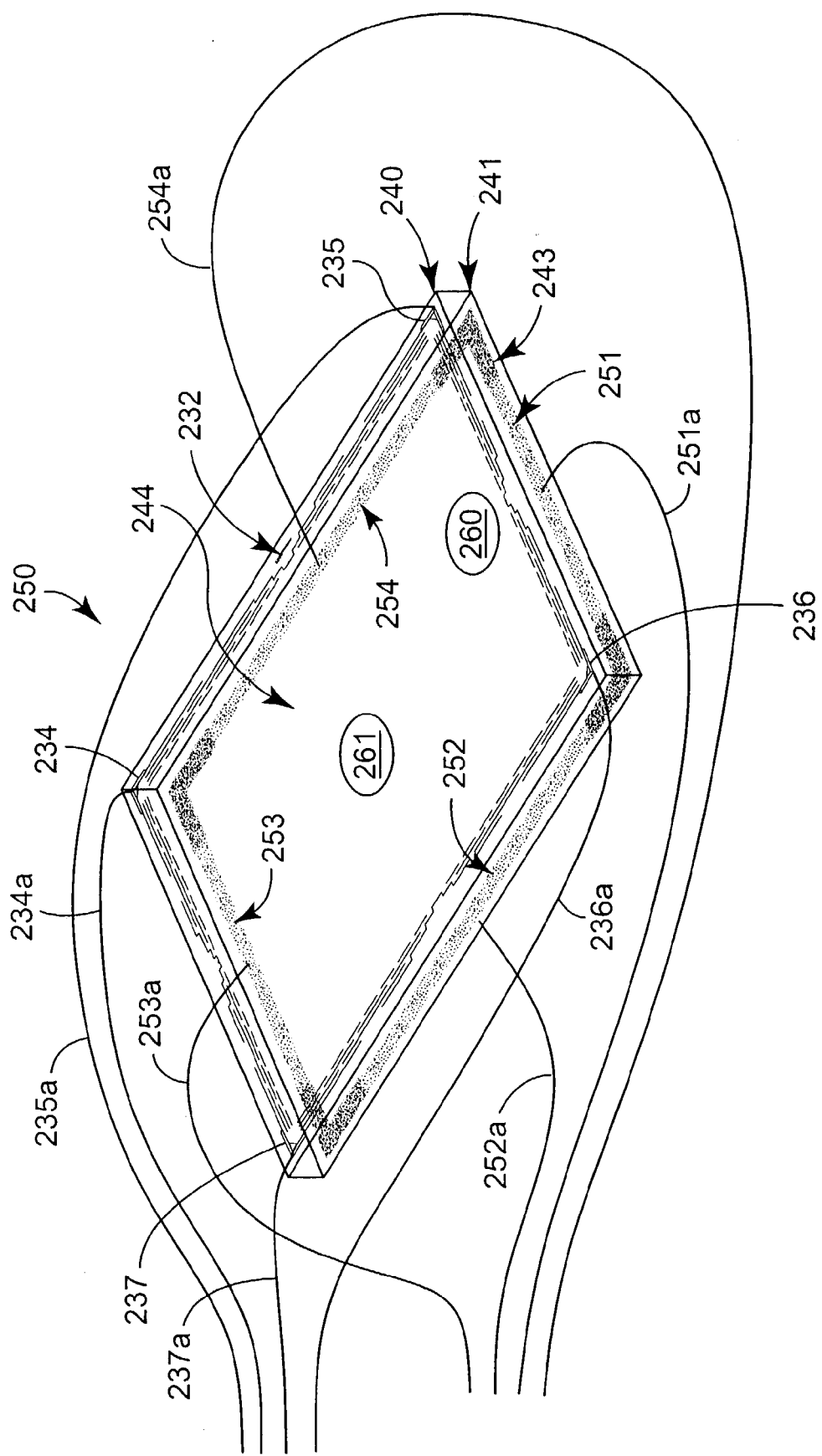
FIG. 23 is an illustration of a capacitive touch screen sensor configuration which employs a multiplicity of rear electrodes in accordance with an embodiment of the present invention.

FIG. 23 illustrates another embodiment of a touch screen sensor well suited for implementing a remote touch simulation methodology of the present invention. According to this embodiment, the TSS sensor 250 includes a linearization electrode pattern 232 connected to a top resistive layer 244 which are respectively disposed on a top surface 240 of the sensor 250. The linearization electrode 232 includes four corner terminals 234, 235, 236, 237 respectively connected to a TSS controller (not shown) via wires 234a, 235a, 236a, 237a.

The rear electrode arrangement in the embodiment of FIG. 23 includes a number of discrete rear electrodes situated on the rear surface 241 of the sensor 250. In the particular configuration shown in FIG. 23, four rear electrodes 251, 252, 253, 254 are located about the perimeter of the rear surface 241, with one of the rear electrodes situated along one of the edge regions of the rear surface 241 of the sensor 250. It is understood that the number and location of the rear electrodes can vary depending on a particular sensor design. As illustrated, rear electrodes 251, 252, 253, 254 make electrical contact with a rear resistive layer 243 provided on the rear surface 241 of the sensor 250.

In a configuration in which multiple rear electrodes are employed, as is the embodiment shown in FIG. 23, the controller (not shown) drives the rear electrodes 251, 252, 253, 254 with an AC voltage equal to that applied at corner terminals 234, 235, 236, 237. When controlled in this manner, the multiple rear electrodes 251, 252, 253, 254 effectively perform the same function as the single rear electrode 142 in the sensor embodiment depicted in FIG. 22.

In a diagnostic mode, touch simulation can be effected by varying a number of drive signal parameters, such as amplitude, phase, and frequency, relative to one another. According to one approach, the controller can apply a first signal to a first surface of the touch screen sensor. The controller applies second signals to the multiple electrodes disposed on or situated proximate the a second surface of the sensor. The controller simulates a touch to the sensor by changing a characteristic of at least one of the second signals relative to the first signal.

For example, and with further reference to FIG. 23, the rear electrodes 251, 252, 253, 254 can be driven with voltages differing in amplitude relative to voltages applied to other rear electrodes and/or the corner terminals 234, 235, 236, 237 on the top surface 240 of the sensor 250. The rear electrodes 251, 252, 253, 254 can be driven with voltages differing in phase relative to voltages applied to other rear electrodes and/or the corner terminals 234, 235, 236, 237 on the top surface 240. Further, the rear electrodes 251, 252, 253, 254 can be driven with voltages differing in frequency relative to voltages applied to other rear electrodes and/or the corner terminals 234, 235, 236, 237 on the top surface 240.

By way of example, rear electrodes 252 and 254 can be undriven, while rear electrode 251 is driven with a voltage out of phase with the voltage applied to corner terminals 234, 235, 236, 237 on the top surface 240, and rear electrode 253 can be driven with a voltage in phase with the voltage applied to the corner terminals 234, 235, 236, 237. In this illustrative example, a simulated touch will be located at point 260 shown in FIG. 23. By way of further example, the controller can drive the rear electrodes 251, 252, 253, 254 at DC, or at equal voltages, of the same frequency, and further drive the corner terminals 234, 235, 236, 237 on the top surface 240 at a voltage unequal to that applied to the rear electrodes 251, 252, 253, 254. This simulated touch, using this approach, will be located at the center of the top surface 240 at point 261.

Independent rear electrodes, such as rear electrodes 251, 252, 253, 254 shown in FIG. 23, can be used to simulate a touch with or without the presence of rear resistive layer 243. If rear resistive layer 243 is not present, higher drive voltages must typically be applied to the rear electrodes in order to simulate a touch.

In accordance with another approach, a non-capacitive technique can be employed to simulate a touch on a touch screen sensor. In a system such as that shown in FIGS. 22 and 23, this non-capacitive simulated touch technique can be employed in the presence or absence of one or both of the rear resistive layer and rear electrode(s). According to this approach, a voltage drive signal can be applied at a number of regions of the touch surface of the sensor. A current flow resulting from application of the voltage drive signals is detected as the simulated touch.

By way of example, and with particular reference to FIG. 23, the controller (not shown) can vary the levels of the drive signals applied to the corner terminals 234, 235, 236, 237 on the top surface 240 relative to one another, and measure the resulting current flows at each of the corner terminals 234, 235, 236, 237. The controller can then measure the current from each of the corner terminals 234, 235, 236, 237 relative to one another. In this way, a simulated touch can be generated.

For example, the controller can increase the drive voltage on all four corner terminals 234, 235, 236, 237 on the top surface 240 to simulate a touch to point 61 at the center of sensor 250. The controller can also increase the drive voltage on corner terminals 235 and 236 relative to the drive signals applied to corner terminals 234 and 237, while maintaining a constant touch detect threshold. This will result in a simulated touch at point 260.

Figure 24:
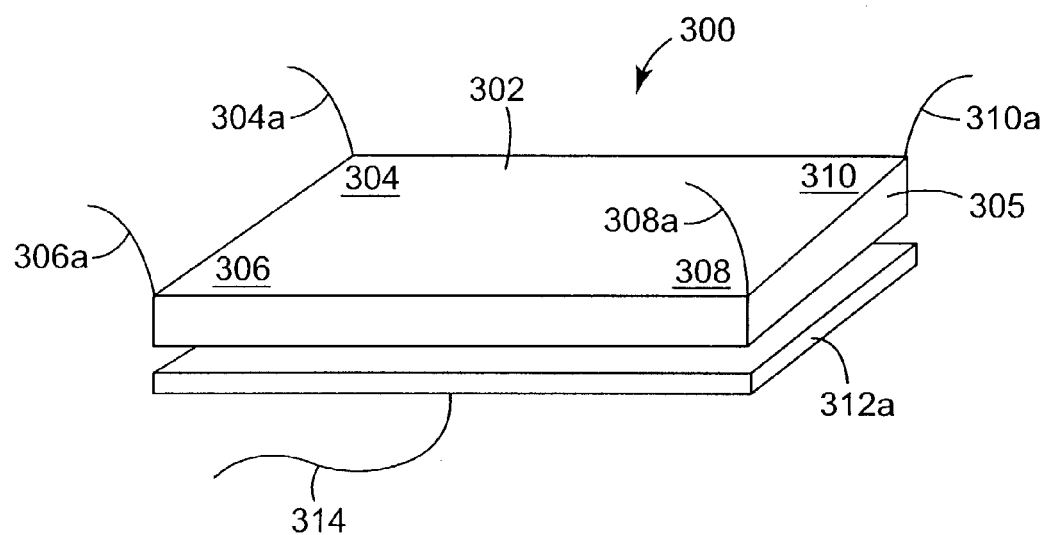
FIG. 24 is an illustration of a capacitive touch screen sensor configuration which employs an electrically conductive structure situated proximate a rear surface of the touch screen sensor in accordance with an embodiment of the present invention.
Figure 25:
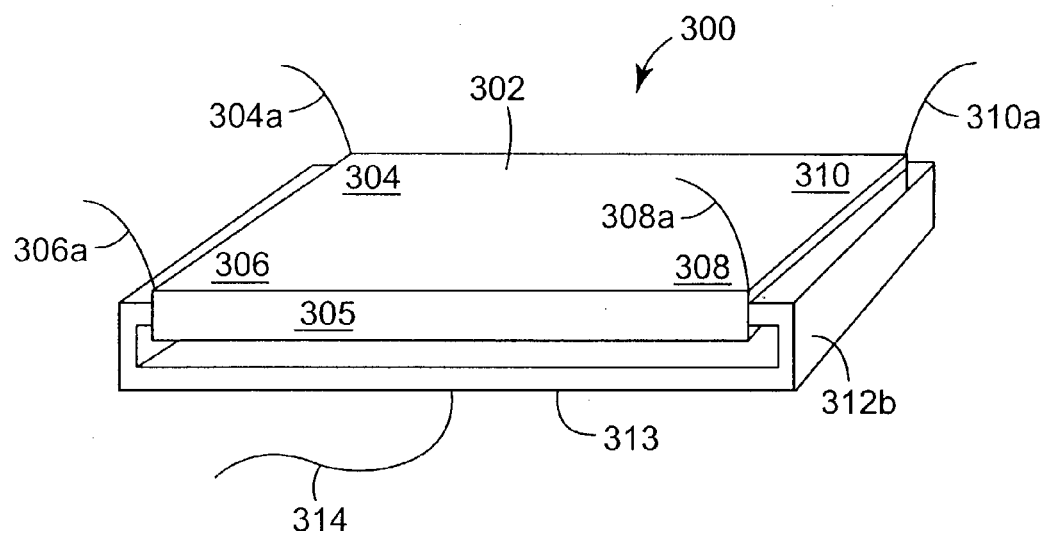
FIG. 25 is an illustration of a capacitive touch screen sensor configuration which employs an electrically conductive frame situated proximate a rear surface of the touch screen sensor and contacting side surfaces of the touch screen sensor in accordance with an embodiment of the present invention.

Referring now to FIGS. 24 and 25, two embodiments of a touch screen sensor are shown, each of which incorporates an electrically conductive structure which is either coupled to, or positioned proximate, the substrate of the touch screen sensor. In the arrangements shown in FIGS. 24 and 25, an electrically conductive structure, which is electrically isolated from the touch screen sensor substrate, is used in combination with the touch screen sensor substrate to effect touch simulation in accordance with the principles of the present invention. The electrically conductive structure can also be effectively used as a backshield to provide for shielding from electrical noise.

In the embodiments shown in FIGS. 24 and 25, a touch screen sensor 300 includes a substrate 305 having a top surface 302 provided with a conductive coating. Corner terminals 304, 306, 308, 310 are electrically connected to the top conductive surface 302 and a controller (not shown) via wires 304a, 306a, 308a, 310a. The sensor 300 can include one or more rear surface electrodes, and may include or exclude a rear resistive layer, as in the configurations shown in FIGS. 22 and 23. Alternatively, or in addition, the electrically conductive structure can include one or more electrodes (e.g., 4 electrodes), each of which is coupled to the controller via a respective wire.

In the embodiment shown in FIG. 24, an electrically conductive structure 312a, such as a thin conductive plate or foil, is situated in a spaced apart relationship with respect to the sensor substrate 305. For example, the conductive structure 312a may be positioned about $\frac{1}{8}$" from the sensor substrate 305. The conductive structure 312a is electrically coupled to the controller via a wire 314.

FIG. 25 shows an embodiment in which an electrically conductive structure 312b represents a frame that provides structural support for the sensor 300. The frame 312b may, for example, may be configured for mounting the sensor 300 within a chassis of a system which incorporates the sensor 300. The frame 312b is coupled to an edge portion of the sensor substrate 305, with an appropriate coating or material provided to electrically insulate the electrically conductive portion of the frame 312b from the sensor substrate 305. The electrically conductive plate surface 313 of the frame 312b is situated in a spaced apart relationship with respect to the sensor substrate 305. The plate surface 313 of the frame 312b is electrically coupled to the controller via a wire 314.

According to one touch simulation approach, the controller can apply a first signal to the top surface 302 of the touch screen sensor 300. The controller can apply a second signal to the electrically conductive structure 312a/b proximate or coupled to the touch screen sensor 300. A touch on the touch screen sensor is simulated by the controller changing one of the first and second signals relative to the other of the first and second signals.

As was described previously, the controller can simulate a centered or non-centered touch on the sensor substrate 305 by varying one or more parameters of the first and second signals, including one or more of the amplitude, phase, and frequency of the drive signals. For example, the controller can apply drive signals to the sensor substrate 305 and the electrically conductive structure 312a/b to develop a potential difference there between. A response to the potential difference is detected as the simulated touch.

Figure 26:
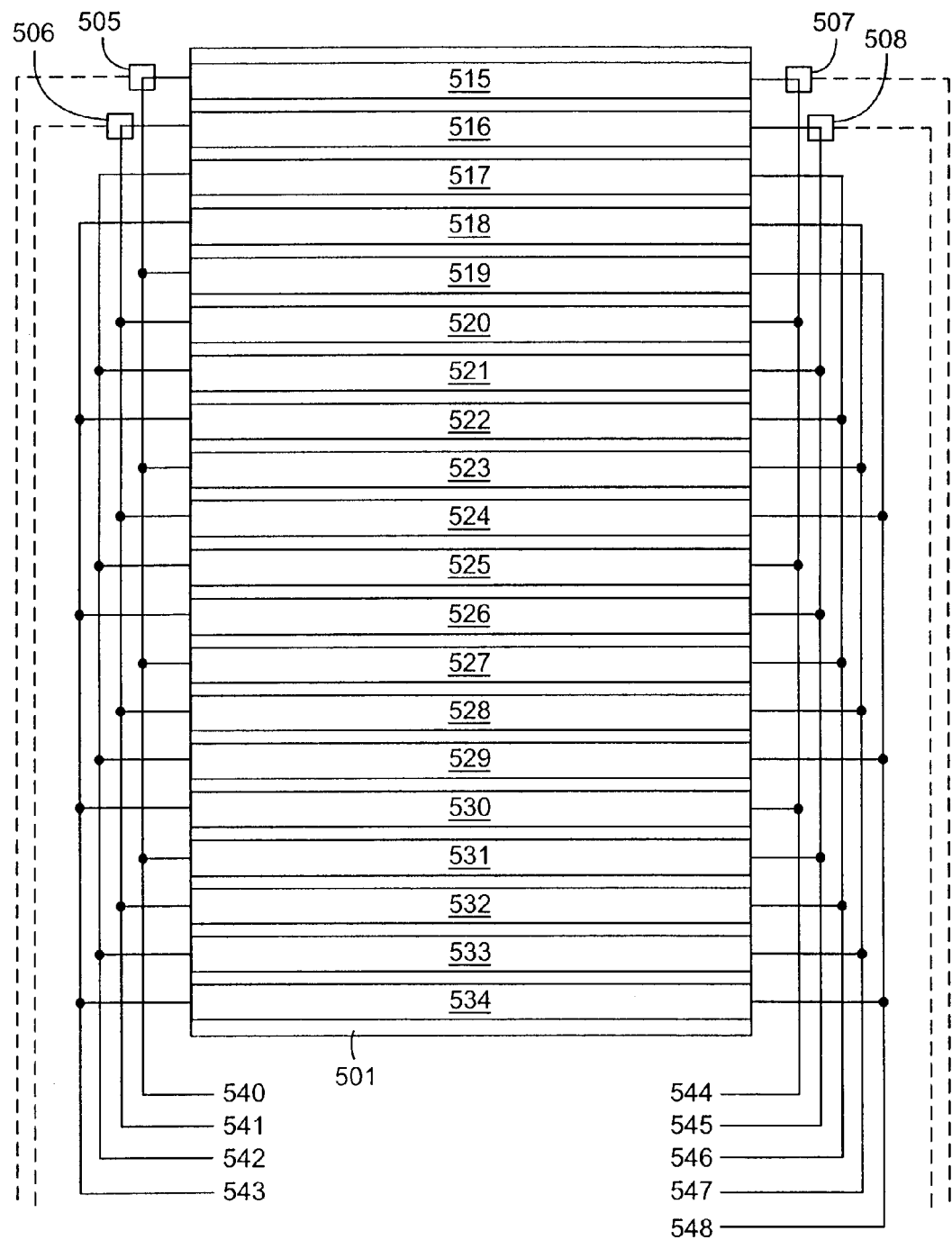
FIG. 26 is a simplified schematic of an near field imaging (NFI) capacitive touch screen sensor configured for automated touch simulation in accordance with an embodiment of the present invention.

As was discussed previously, remote touch simulation methodologies of the present invention can be implemented in a near field imaging (NFI) capacitive touch screen sensor. A simplified schematic of an NFI capacitive touch screen sensor is illustrated in FIG. 26. The NFI capacitive touch screen sensor includes conductive ITO (indium-tin-oxide) bars 515 through 534, deposited on substrate 501, which define the touch sensitive surface. Bar connections 540 through 548 connect the ITO bars to an electronic controller (not shown).

A touch is detected by activating bars 515–534 with an AC signal, and measuring changes in current flowing in connections 540–548 due to capacitive coupling from one or more bars to a finger or stylus in proximity to the bar(s). Vertical position is determined by the relative magnitude of the change in current among the bars. Horizontal position is determined by measuring the ratio of current change in a bar between its left side connection (540–543) and its right side connection (544–548).

Touch may be simulated in this system by adding simulation electrodes 505, 506, 507, 508 in proximity to the left and right ends of selected bars or in proximity to the bar connections as shown. These added electrodes may be placed on or in proximity with the rear surface of substrate 501, or they may be placed in front of bar ends or connections 540–548. The added electrodes are connected to the electronic controller (not shown). Four simulation electrodes are shown in FIG. 26 for simplicity, though one simulation electrode may be placed at the end of each connection 540–548. During normal touch detection; simulation electrodes may be electrically disconnected, or driven with a signal that is equal in magnitude and phase with the signals driven onto connections 540–548.

A touch may be simulated by driving one of the left side simulation electrodes 505, 506 and one of the right side simulation electrodes 507, 508 with a signal that is unequal to the signals driven onto lines 540–548. Simulation electrodes may be grounded, or driven with an AC signal that is a different magnitude or out of phase with the signals on lines 540–548. For example, grounding electrodes 505 and 507 will result in a simulated touch in the center of bar 515. Driving electrode 517 with an AC signal equal in magnitude and in phase with the signals on lines 540–548, while grounding electrode 505, results in a simulated touch near the left end of bar 515. Grounding electrodes 505 and 508 simulates a touch to the center of bar 531.

Figure 27:
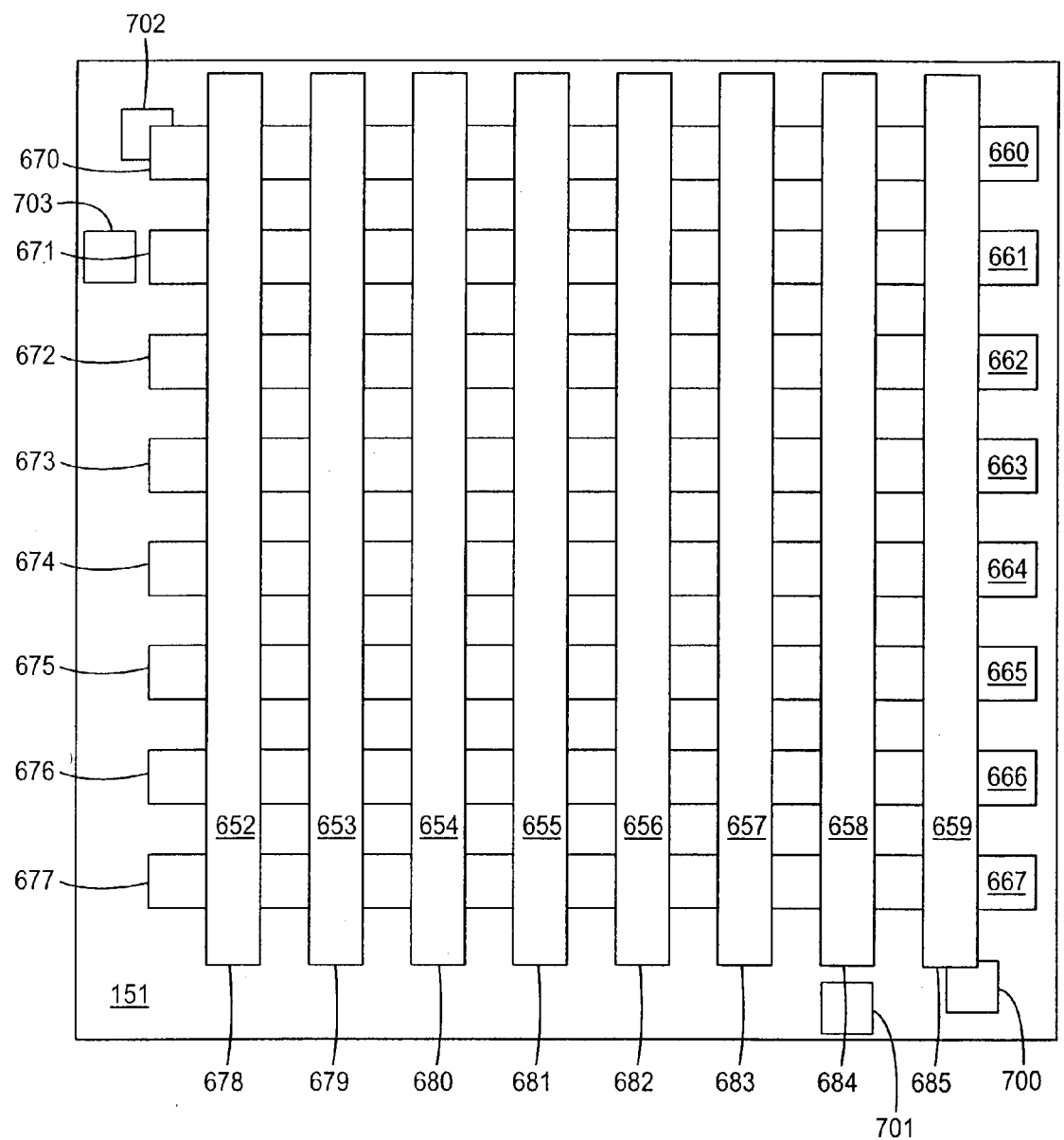
FIG. 27 is a simplified schematic of a grid capacitive touch screen sensor configured for automated touch simulation in accordance with an embodiment of the present invention.
Figure 10:
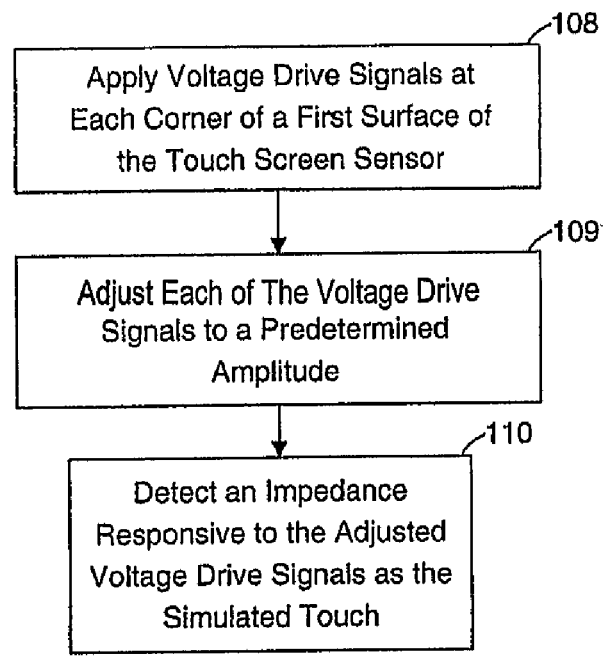
Figure 11:
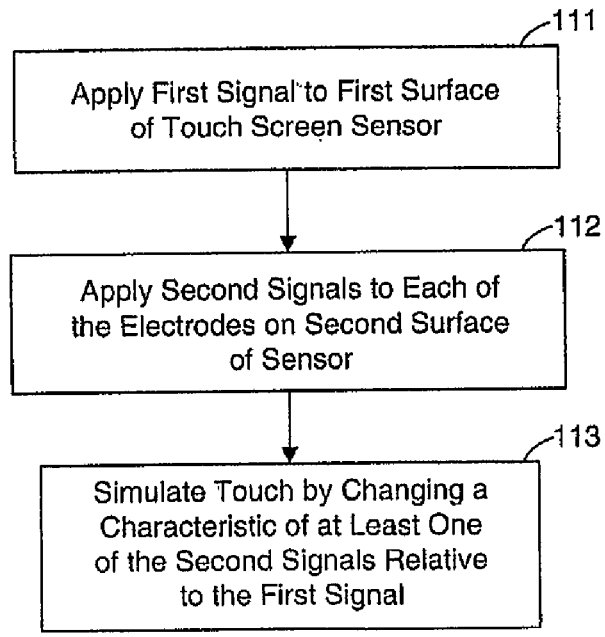
Figure 12:
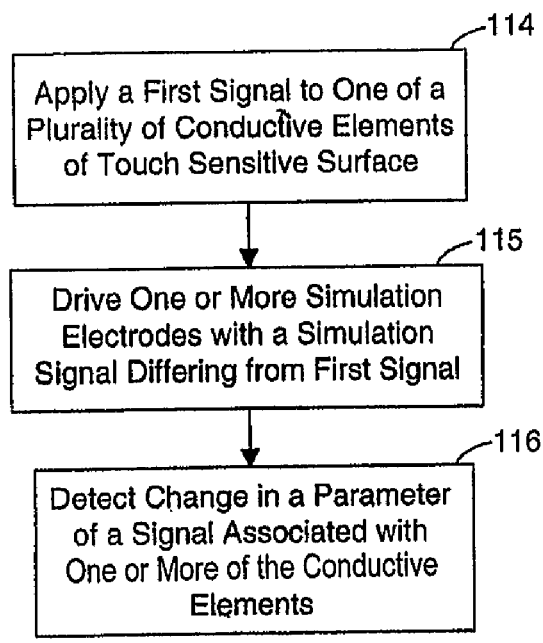
Figure 13:
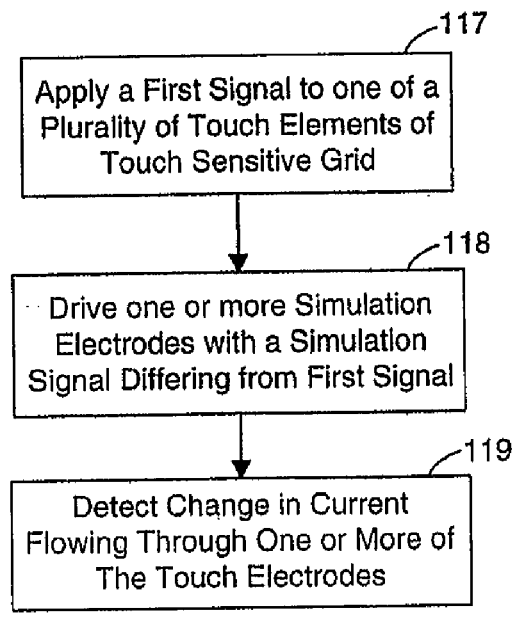

Another touch screen sensor of a technology amenable to automated and remote touch simulation, as previously discussed, is a grid capacitive touch screen sensor. FIG. 27 shows a grid capacitive touch screen in accordance with an embodiment of the present invention. Electrodes 652–667 are activated sequentially with an AC signal. A finger of stylus in proximity with one or more of the electrodes 652–667 capacitively couples to them and alters the impedance of the electrode in proportion to the magnitude of the capacitive coupling. This impedance change is measured on each electrode, and the relative changes are used to calculate position.

Touch simulation on this type of touch screen sensor is similar to that associated with NFI capacitive touch screen sensors, in that a simulation electrode 700, 701, 702, 703 near one of the touch electrodes 652–667 or near the electrode connections 670–685 may be grounded or driven with a signal that will couple to touch electrodes and change the electrode's impedance to simulate a touch. Only four simulation electrodes are shown in FIG. 27 for simplicity. As few as one simulation electrode per dimension may be used, or as many as one per touch electrode.

As an alternative to simulation electrodes constructed on or near the touch sensor, capacitive coupling to touch electrodes 652–667 or electrode connections 670–685 may be accomplished by connecting standard capacitors to electrode connections 670–685. Such capacitors may be located on the sensor or its cable, or on the electronic controller that generates the signals that drive the sensor.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for use with a touch screen system which comprises a touch screen sensor, the method comprising:
    establishing a communication link between the touch screen system and a remote location;
    simulating a touch to the touch screen sensor from the remote location; and
    communicating simulation data acquired during touch simulation from the touch screen system to the remote location via the communication link,
    wherein simulating the touch further comprises simulating the touch during performance of a touch screen system diagnostic function, and data associated with perfomance of the touch screen system diagnostic function is communicated to the remote location via the communication link.

2. A method for use with a touch screen system which comprises a touch screen sensor, the method comprsing:
    establishing a communication link between the touch screen system and a remote location;
    simulating a touch to the touch screen sensor;
    communcating simulation data acquired during touch simulation from the touch screen system to the remote location via the communication link;
    performing a touch screen system diagnostic function in response to a remotely orginating control signal; and
    performing a touch screen system calibration function in response to a result from the touch screen diagnostic function.

3. A method for use wtth a touch screen system which comprises a touch screeen sensor, the method comprising:
    establishing a communication link between the touch screen system and a remote location;
    simulating a touch to the touch screen sensor; communicating simulatin data acquired during touch simulation from the touch screen system to the remote location via the communcation link, and; changing, from the remote location, a touch detection or location calculation used by the touch screen system to simulate the touch.

4. A method for use with a touch screen system which comprises a touch screen sensor, the method comprising:
    establishing a communication link between the touch screen system and a remote location;
    simulating a touch to the ouch screen sensor;
    communicating simulation data acquired during touch simulation from the touch screen system to the remote location via the communciation link; and
    wherein the touch screen system is communicatively coupled to a local host computing system, and establishing the communication link comprises establishing the communication link between the touch screen system and the remote location via the local host computing system.

5. A method for use with a touch screen system which comprises a capacitive touch screen sensor, the method comprising:
    establishing a communication link between the touch screen system and a remote location;
    initiating a touch simulation procedure that comprises measuring changes in current flow at corners of the touch screen sensor in response to capacitive coupling that simulates a touch to the sense surface by an object;
    simulating a touch to the touch screen sensor in accordance with the touch simulation procedure; and
    communicating, via the communication link, data associated with simulating the touch between the touch screen system and a remote location.

6. The method of claim 5, wherein the touch screen sensor is configured as a capacitive touch screen sensor comprising a first surface and a second surface opposing the first surface, the touch simulation procedure comprsing:

developing a potential difference between the first surface and the second surface of the touch screen sensor; and detecting a response to the potential difference as the simulated touch.

7. The method of claim 6, wherein the second surface comprises a conductive structure proximate the first surface, and developing the potential difference comprises:

applying first and second voltage signals of substantially equal amplitude respectively to the first and second surfaces during an operational mode of the touch screen system; and changing one or both of the first and second voltage signal amplitudes to develop the potential difibrence between the first surface and conductive structure.

8. The method of claim 6, wherein developing the potential difference comprises applying a first AC voltage signal and a second AC voltage signal respectively to the first and second surfaces, and varying a characteristic of one of the first and second AC voltage signals relative to the other of the first and second AC voltage signals.

9. The method of claim 6, wherein detecting the response to the potential difference comprises detecting a current at each of a pluralty of corners of the first surface, and converting each of the currents to corresponding values.

10. The method of claim 6, further comprising associating the detected response to the potential difference with a posttion of the simulated touch on the touch screen sensor.

11. The method of claim 5, the touch screen sensor comprising a substrate having a first surface and a second surface opposing the first surface, and an electrically conductive structure coupled to, or positioned proximate, the substrate and situated proximate the second surface, the touch simulation procedure comprising:

applying a first signal to the first surface of the touch screen sensor;

applying a second signal to the conductive structure of the touch screen sensor; and simulating the touch on the touch screen sensor by changing one of the first and second signals relative to the other of the first and second signals.

12. The method of claim 11, further comprising using the conductive structure as a shield against etectrical noise.

13. The method of claim 11, wherein simulating the touch comprises changing an amplitude of the first signal relative to an amplitude of the second signal.

14. The method of claim 11, wherein simulating the touch comprises changing a phase or the first signal relative to a phase of the second signal.

15. The method of claim 11, wherein simulating the touch comprises changing a frequency of the first signal relative to a frequency of the second signal.

16. The method of claim 5, the touch screen sensor comprising a substrate having a first surface and a second surface opposing the first surface, and a pluarlity of electrodes disposed on or proximate to the second surface, the touch simulation procedure comprising:

applying a first signal to the first surface of the touch screen sensor;

applying one of a plurality of second signals to each of the plurality of electrodes disposed on or proximate to the second surface of the touch screen sensor; and simulating the touch on the touch screen sensor by changing a characteristic of at least one of the plurality of second signals relative to the first signal.

17. The method of claim 16, wherein the characteristic comprises amplitude, and the pluarlity of second signals have substantially equal amplitudes.

18. The method of claim 16, wherein the characteristic comprises amplitude, and the at least one of the plurality of second signals has an amplitude differing from an ampilitude of others of the plurality of second signals.

19. The method of claim 16, wherein the characteristic comprises frequency, and the plurality of second signals have substantially equal frequencies.

20. The method of claim 16, wherein the characteristic comprtses frequency, and the at least one of the plurality of second signals has a frequency differing from a frequency of others of the plurality of second signals.

21. The method of claim 16, wherein the characteristic comprises phase, and the plurality of second signals have a substantially equal phase.

22. The method of claim 16, wherein the characteristic comprises phase, and the at least one of the plurality of second signals has a phase differing from a phase of others of the plurality of second signals.

23. The method of claim 5, the touch screen sensor comprising a substrate having a first surface and a second surface opposing the first surface, the touch simulation procedure comprising:

a plurality of voltage drive signals at a plurality of regions of the touch screen sensor; and detecting a current flow application of the plurality of voltage drive signals as the simulated touch.

24. The method of claim 23, wherein the voltage drive sinnais have substantially equal amplitudes.

25. The method of claim 23, wherein at least one of the voltage drive signals has an amplitude differing from others of the plurality of voltage drive signals.

26. The method of claim 23, wherein detecting the current flow comprises detecting a change in a current at each of a plurality of corner regions of the first surrace.

27. The. method of claim 23, further comprising detecting an impedance change between one corner region of the first surface relative to other corner regions of the first surface.

28. The method of claim 23, wherein the applying and detecting processes are repeated over a duration of time, the method further comprising detecting variations in the current flow over the duration of time.

29. The method of claim 5, wherein the touch screen sensor comprises a substrate having a plurality of electrical conductors and a plurality of simulation electrodes provided proximate to the electrical conductors, the touch simulation procedure comprising:

applying a first signal to at least one of the plurality of electrical conductors of the touch sensitive surface; driving at least one of the simulation electrodes with a simulation signal having a characteristic differing from that of the first signal; and detecting a change in a parameter of a signal associated with at least one of the plurality of electrical conductors as the simulated touch.

30. The method of claim 29, wherein the simulation signal has an amplitude differing from that of the first signal.

31. The method of claim 29, wherein the simulation signal has a phase differing from that of the first signal.

32. The method of claim 29, wherein at least one of the simulation electrodes is grounded during touch simulation.

33. The method of claim 5, wherein the touch screen system comprises a grid capacitive touch screen sensor, the touch screen sensor comprising a substrate having a touch sensitive grid of touch electrodes and a plurality of simulation electrodes provided proximate to the touch electrodes, the touch simulation procedure comprising:

applying a first signal to at least one of the touch electrodes;
driving at least one of the simulation electrodes with a simulation signal having a characteristic differing from that of the first signal; and
detecting a change in current flowin through the at least one of the touch electrodes as the simulated touch.

34. The method of claim 33, wherein the simulation signal has an amplitude differing from that of the first signal.

35. The method of claim 33, wherein the simulation signal has a phase differing from that of the first signal.

36. The method of claim 33, wherein at least one of the simulation electrodes is grounded during touch simulation.

37. A method for use with a touch screen system which comprises an infrared touch screen sensor, the touch screen sensor comprising a frame that supports a matrix of inwardly directed IR transmitters and IR detectors, an arrangement of the IR transmitters situated opposite a corresponding arrangement of the IR detectors, the method comprising:
establishing a communication link between the touch screen system and a remote location;
intiating a touch simulation procedure comprising:
activating the IR transmitters and IR detectors to create a grid of sense beams within the frame; and
deactivating one or more of the sense beams to simulate the touch at a location corresponding to the one or more deactivated sense beams;
simulating a touch to the touch screen sensor in accordance with the touch simulation procedure; and
communicating, via the communication link, data associated with simulating the touch between the touch screen system and a remote location.

38. The method of claim 37, wherein activatinti the IR transmitters cormprises sequentially pulsing the IR transmitters.

39. The method of claim 37, wherein deactivating the one or more sense beams comprises deactivating one or more IR transmitters associated with the one or more deactivated sense beams.

40. The method of claim 37, wherein deactivating the one or more sense beams comprises deactivating one or more IR detectors associated with the one or more deactivated sense beams.

41. The method of claim 5, wherein the touch simulation procedure is initiated at the remote location.

42. The method of claim 5, wherein the touch simulation procedure is initiated local to the touch screen system.

43. A method for use with a touch screen system which comprises a touch screen sensor, the method comprising:
establishing a communication link between the touch screen system and a remote location;
initiating a touch simulation procedure;
simulating a touch to the touch screen sensor in accordance with the touch simulation procedure; and
communicating, via the communication link, data associated with simulating the touch between the touch screen system and a remote location,
wherein the touch simulation to the touch screen sensor is repeated over a duration of time, the method fhrther comprising detecting a change in a position of the simulated touch over the duration oil time.

44. The method of claim 43, further comprising generating a message signal associated with the detected change in simulated touch position, and communicating the message signal to the remote location via the comniumeaton link.

45. A method for use with a touch screen system which comprises a touch screen sensor, the method comprising:
establishing a communicaton link between the touch screen system and a remote location;
initiating a touch simulation procedure;
simulating a touch to the touch screen sensor in accordance with the touch simulation procedure; and
communicating, via the communication link, data associated with simulating the touch between the touch screen system and a remote location,
wherein a result of the touch simulation is compared to one or more predetermined limits, and the result exceeding the one or more predetermined limits is used to assess operation fitness of the touch screen system.

46. A method for use with a touch screen system which comprises a touch screen sensor, the method comprising:
establishing a communication link between the touch screen system and a remote location;
initiating a touch simulation procedure;
simulating a touch to the touch screen sensor in accordance with the touch simulation procedure; and
communicating, via the communication link, data associated with simulating the touch between the touch screen system and a remote location,
wherein a current result of the touch simulation is compared to one or more previously measured results of the touch simulation, and the current result deviating from the previously measured results by a predetermined amount is used to assess operational fitness of the touch screen system.

47. The method of claim 5, wherein a result of the touch simulaton is used to compensate for inaccuracies of the touch screen system or a system incorporating the touch screen system.

48. The method of claim 5, wherein the touch screen system is communicatively coupled to a local host computing system, and establishing the communication link comprises establishing the communication link between the touch screen system and the remote location via the local host computing system.

49. A touch screen sensor, comprising:
a touch screen sensor;
a communications interface for establishing a communication link between the touch screen system and a remote processing system;
a touch screen controller, the touch screen controller simulating a touch to the touch screen sensor in response to an initiation signal, and communicating data associated with simulating the touch to the remote processing system via the communication link; and
a host processing system communicatively coupled to the touch screen controller.

50. The system of claim 49, wherein the touch screen controller is communicatively coupled to the remote processing system via the host processing system.

51. The system of claim 49, wherein the host processing system comprises all or part of a processing system of an electronic kiosk system.

52. The system of claim 49, wherein the host processing system comprises one or more network servers.

53. The system of claim 49, wherein the host processing system comprises one or more network servers, each of the network servers communicatively coupled to the communications interface of a plurality of the touch screen sensors.

54. The system of claim 53, wherein each of network servers is communicatively coupled to the remote processing system via a communications network link.

55. The system of claim 49, wherein the initiation signal is communicated from the host processing system to the touch screen controller.

56. The system of claim 50, wherein the initiation signal is communicated from the remote processing system to the host processing system or the touch screen controller.

57. The system of claim 49, wherein the host processing system maintains a touch screen system activity log, the activity log storing one or more of configuration, performance, touch quality, diagnostics, calibration, and troubleshooting data concerning the touch screen system, the data stored in the activity log accessible and transferable to the remote processing system via the communications link.

58. The system of claim 49, wherein the host processing system stores de-bug firmware and transfer the de-bug firmware to the touch screen controller for evaluating a fault condition of the touch screen sensor.

59. The system of claim 49, wherein the host processing system stores diagnostics software and transfers the diagnostics software to the touch screen controller, the touch screen controller implementing the diagnostic software to perform a diagnostic function.

60. The system of claim 49, wherein the host processing system stores calibration software and transfers the calibration software to the touch screen controller, the touch screen controller implementing the calibration software to perform a calibration function.

61. A touch screen sensor, comprising:
a touch screen sensor;
a communication interface for establishing a communication link between the touch screen system and a remote processing system;
a touch screen controller, the touch screen controller simulating a touch to the touch screen sensor in response to an initiation signal, and communicating data associated with simulating the touch to the remote processing system via the communication link, wherein the touch screen controller, in response to a diagnostics control signal, implements a diagnostic function involving the simulated touch wherein the touch screen controller coordinates communication of diagnostics data between the touch screen controller and the remote processing system via the communication link.

62. A touch screen sensor, comprising:
a touch screen sensor;
a communications interface for establishing a communication link between the touch screen system and a remote processing system;
a touch screen controller, the touch screen controller simulating a touch to the touch screen sensor in response to an initiation signal, and communicating data associated with simulating the touch to the remote processing system via the communication link, wherein the touch screen controller, in response to a calibration control signal, implements a calibration function involving the simulated touch, and wherein the touch screen controller coordinates communication of calibration data between the touch screen controller and the remote processing system via the communication link.

63. A touch screen sensor, comprising:
a touch screen sensor;
a communications interface for establishing a communication link between the touch screen system and a remote processing system;
a touch screen controller, the touch screen controller simulating a touch to the touch screen sensor in response to an initiation signal, and communicating data associated with simulating the touch to the remote processing system via the communication link, wherein the touch screen controller, in response to a diagnostics control signal, implements a diagnostic function and, in response to a result from the diagnostic function, implements a calibration function.

64. The system of claim 49, wherein the remote processing system, via the communication link, changes a touch detection or location calculation used by the touch screen controller to simulate the touch.

65. The system of claim 49, wherein the remote processing system, via the communication link and touch screen controller, transfers a software patch or program upgrade to the touch screen controller.

66. The system of claim 49, wherein the touch screen system comprises a capacitive touch screen system.

67. The system of 49, wherein the touch screen system comprises a grid capacitive touch screen system.

68. The system of claim 49, wherein the touch screen system comprises a near field imaging capacitive touch screen system.

69. The system of claim 49, wherein the touch screen system comprises an infrared touch screen system.

* * * * *

UNITED STATES PATENT AND TRADEMARK OFFICE
CERTIFICATE OF CORRECTION

PATENT NO. : 7,236,161 B2
APPLICATION NO. : 10/394522
DATED : June 26, 2007
INVENTOR(S) : Bernard O. Geaghan It is certified that error appears in the above-identified patent and that said Letters Patent is hereby corrected as shown below:

Drawings,
In the drawings, Sheet 10, Figure 10, Box 109, delete "he" and insert -- The --, therefor. As shown in the attached
In the drawings, Sheet 11, Figure 12, Box 116, delete "On" and insert -- One --, therefor. As shown in the attached Column 18,
Line 55, After "the" delete "a".

Column 21,
Line 9, delete "detection;" and insert -- detection, --, therefor.

Column 22,
Line 9, In Claim 1, delete "perfomance" and insert -- performance --, therefor.
Line 13, In Claim 2, delete "comprsing:" and insert -- comprising: --, therefor.
Line 17, In Claim 2, delete "communcating" and insert -- communicating --, therefor.
Line 21, In Claim 2, delete "orginating" and insert -- originating --, therefor.
Line 25, In Claim 3, delete "wtth" and insert -- with --, therefor.
Line 26, In Claim 3, delete "screeen" and insert -- screen --, therefor.
Line 30, In Claim 3, delete "simulatin" and insert -- simulation --, therefor.
Line 32, In Claim 3, delete "communcation" and insert -- communication --, therefor.
Line 40, In Claim 4, delete "ouch" and insert -- touch --, therefor.
Line 43, In Claim 4, delete "communciation" and insert -- communication --, therefor.
Line 67, In Claim 6, delete "comprsing:" and insert -- comprising: --, therefor.

Column 23,
Line 13, In Claim 7, delete "difibrence" and insert -- difference --, therefor.
Line 23, In Claim 9, delete "pluralty" and insert -- plurality --, therefor.
Line 27, In Claim 10, delete "posttion" and insert -- position --, therefor.
Line 42, In Claim 12, delete "etectrical" and insert -- electrical --, therefor.
Line 47, In Claim 14, delete "or" and insert -- of --, therefor.
Line 54, In Claim 16, delete "pluarlity" and insert -- plurality --, therefor.
Line 66, In Claim 17, delete "pluarlity" and insert -- plurality --, therefor.

UNITED STATES PATENT AND TRADEMARK OFFICE
CERTIFICATE OF CORRECTION

PATENT NO.          : 7,236,161 B2
APPLICATION NO. : 10/394522
DATED                   : June 26, 2007
INVENTOR(S)         : Bernard O. Geaghan It is certified that error appears in the above-identified patent and that said Letters Patent is hereby corrected as shown below:

Column 24,
Line 3-4, In Claim 18, delete "ampilitude" and insert -- amplitude --, therefor.
Line 9, In Claim 20, delete "comprtses" and insert -- comprises --, therefor.
Line 13, In Claim 21, after "have" delete "a".
Line 23, In Claim 23, after "comprising:" insert -- applying --.
Line 25, In Claim 23, after "current flow" insert -- resulting from --.
Line 28, In Claim 24, delete "sinnais" and insert -- signals --, therefor.
Line 33, In Claim 26, after "in a current" insert -- flow --.
Line 34, In Claim 26, delete "surrace." and insert -- surface. --, therefor.

Column 25,
Line 6, In Claim 33, delete "flowin" and insert -- flowing --, therefor.
Line 22, In Claim 37, delete "intiating" and insert -- initiating --, therefor.
Line 33, In Claim 38, delete "activatinti" and insert -- activating --, therefor.
Line 34, In Claim 38, delete "cormprises" and insert -- comprises --, therefor.
Line 59, In Claim 43, delete "fhrther" and insert -- further --, therefor.
Line 61, In Claim 43, delete "oil" and insert -- of --, therefor.
Line 65, In Claim 44, delete "comniumeaton" and insert -- communication --, therefor.

Column 26,
Line 1, In Claim 45, delete "communicaton" and insert -- communication --, therefor.
Line 12, In Claim 45, delete "operation" and insert -- operational --, therefor.
Line 31, In Claim 47, delete "simulaton" and insert -- simulation --, therefor.

Column 27,
Line 15, In Claim 58, delete "transfer" and insert -- transfers --, therefor.
Line 30, In Claim 61, delete "communication" and insert -- communications --, therefor.

Signed and Sealed this

Sixteenth Day of October, 2007

JON W. DUDAS
*Director of the United States Patent and Trademark Office*